United States Patent
Wallace

(10) Patent No.: US 11,426,955 B2
(45) Date of Patent: Aug. 30, 2022

(54) VACUUM FORMING A LAMINATE CHARGE

(71) Applicant: Airbus Operations Limited, Bristol (GB)

(72) Inventor: Alexander Stephen Wallace, Somerset (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 393 days.

(21) Appl. No.: 16/330,904

(22) PCT Filed: Sep. 6, 2017

(86) PCT No.: PCT/GB2017/052591
§ 371 (c)(1),
(2) Date: Mar. 6, 2019

(87) PCT Pub. No.: WO2018/046908
PCT Pub. Date: Mar. 15, 2018

(65) Prior Publication Data
US 2019/0210304 A1 Jul. 11, 2019

(30) Foreign Application Priority Data

Sep. 7, 2016 (GB) ..................................... 1615213

(51) Int. Cl.
*B29C 70/44* (2006.01)
*B29B 11/16* (2006.01)

(52) U.S. Cl.
CPC .............. *B29C 70/44* (2013.01); *B29B 11/16* (2013.01); *B29C 70/443* (2013.01)

(58) Field of Classification Search
None
See application file for complete search history.

(56) References Cited

U.S. PATENT DOCUMENTS 2,973,558 A 3/1961 Stratton, Jr.
4,562,033 A 12/1985 Johnson et al.
(Continued)

FOREIGN PATENT DOCUMENTS

DE 10 2011 119 046 5/2013
DE 10 2012 020 095 4/2014
(Continued)

OTHER PUBLICATIONS

International Search Report for PCT/GB2017/052591 dated Mar. 21, 2018, 7 pages.
(Continued)

*Primary Examiner* — Christopher T Schatz
(74) *Attorney, Agent, or Firm* — Nixon & Vanderhye P.C.

(57) ABSTRACT

A method of forming a laminate charge, and a forming tool and apparatus for forming a laminate charge is disclosed. In a forming step, a suction force is generated between a forming tool and an impermeable sheet which causes the impermeable sheet to press the laminate charge against a male corner of the forming tool and into a female corner of the forming tool. The male corner of the forming tool is positioned between first and second parts of the laminate charge, and the female corner of the forming tool is positioned between second and third parts of the laminate charge. During the forming step, gas is injected between the forming tool and part of the laminate charge to create a gas cushion between the forming tool and the third part of the laminate charge. This gas cushion inhibits the third part of the laminate charge from becoming clamped against the forming tool as the laminate charge is pressed into the female corner of the forming tool.

16 Claims, 28 Drawing Sheets

(56) References Cited

U.S. PATENT DOCUMENTS

| | | | |
|---|---|---|---|
| 4,902,215 A * | 2/1990 | Seemann, III | B29C 43/56 |
| | | | 425/406 |
| 4,946,640 A | 8/1990 | Nathoo | |
| 6,610,229 B1 | 8/2003 | Morales et al. | |
| 2008/0210372 A1 | 9/2008 | Cumings et al. | |
| 2015/0314583 A1 * | 11/2015 | Jess | B32B 5/02 |
| | | | 156/324.4 |

FOREIGN PATENT DOCUMENTS

| | | |
|---|---|---|
| DE | 10 2015 200 813 | 8/2015 |
| EP | 2 047 972 | 4/2009 |
| EP | 2 206 598 | 7/2010 |
| GB | 2 124 130 | 2/1984 |
| GB | 2 454 881 | 5/2009 |

OTHER PUBLICATIONS

Written Opinion of the ISR for PCT/GB2017/052591 dated Mar. 21, 2018, 9 pages.
Search Report for GB1615213.4 dated Feb. 28, 2017, 4 pages.

* cited by examiner

VACUUM FORMING A LAMINATE CHARGE

CROSS RELATED APPLICATIONS

This application is the U.S. national phase of International Application No. PCT/GB2017/052591 filed on Sep. 6, 2017, which designated priority to United Kingdom (GB) patent application 1615213.4, filed Sep. 7, 2016, the entire contents of each of which are hereby incorporated by reference.

FIELD OF THE INVENTION

The present invention relates to a method of forming a laminate charge. The invention also relates to a forming tool and apparatus for forming a laminate charge. The charge is typically, although not exclusively, either a composite material or a preform which is subsequently infused to form a composite material.

BACKGROUND OF THE INVENTION

A known method of vacuum moulding a composite material is described in U.S. Pat. No. 4,562,033. Prepregs are placed on a heated former and covered with a sheet of a micro-porous film material, a breather material and an impermeable membrane.

A problem with some known vacuum moulding processes is that it can be difficult for the charge to be easily sucked into the female corner of the forming tool without becoming clamped against the forming tool.

Another known method for the shaping of a sheet of preform material is described in U.S. Pat. No. 4,946,640.

SUMMARY OF THE INVENTION

A first aspect of the invention provides a method of forming a laminate charge as set out in claim 1. During a vacuum forming step, gas is injected between the forming tool and a third part of the laminate charge to create a gas cushion between the forming tool and the third part of the laminate charge. The gas cushion inhibits the third part of the laminate charge from becoming clamped against the forming tool as the laminate charge is pressed into the female corner of the forming tool.

After the forming step, the charge may be removed from the tool without applying a suction force to the third part of the charge. However, more typically the method further comprises stopping the injection of gas between the forming tool and the third part of the laminate charge, and generating a suction force between the forming tool and the impermeable sheet, which causes the impermeable sheet to press the third part of the laminate charge against the forming tool.

Optionally the third part of the laminar charge is a flange with an edge, and at least some of the gas injected between the forming tool and the third part of the laminate charge exits the gas cushion by flowing past the edge of the flange. Alternatively the gas injected between the forming tool and the third part of the laminate charge may exit the gas cushion by flowing through the thickness of the laminar charge, or by flowing into vacuum openings in the second face of the forming tool.

The third part of the laminar charge may be a flange with an edge, or it may extend to form a further corner—for instance to form a stepped shape.

The suction force which causes the impermeable sheet to press the laminate charge against the male corner of the forming tool and into the female corner of the forming tool, and the suction force which causes the impermeable sheet to press the third part of the laminate charge against the forming tool, may be generated by the same vacuum generator or by different vacuum generators. The corners of the forming tool may be of any angle or shape. The surfaces of the forming tool may be of any angle or shape.

Typically the gas is a compressed gas—for instance from a compressed gas canister.

The gas may be air, or any other suitable gas.

The method may be used, at a minimum, to form the charge into a "Z" shape, but it may also be used to form more complex shapes, such as a top-hat shape, an omega shape, or a stepped shape. In a preferred example the laminate charge has fourth and fifth parts; the forming tool has a second male corner and a second female corner; and the method further comprises: in the forming step, generating a suction force between the forming tool and the impermeable sheet which causes the impermeable sheet to press the laminate charge against the second male corner of the forming tool and into the second female corner of the forming tool, wherein the second male corner of the forming tool is positioned between the first and fourth parts of the laminate charge, and the second female corner of the forming tool is positioned between the fourth and fifth parts of the laminate charge; and during the forming step, injecting gas between the forming tool and the fifth part of the laminate charge in order to create a second gas cushion between the forming tool and the fifth part of the laminate charge.

The second gas cushion performs the same function as the first gas cushion—it inhibits the fifth part of the laminate charge from becoming clamped against the forming tool as the laminate charge is pressed into the female corner of the forming tool. This enables the charge to be formed into a top-hat or omega shape.

The male corner is positioned between a first face of the forming tool and a second face of the forming tool; and the female corner is positioned between the second face of the forming tool and a third face of the forming tool. The forming tool may have vacuum openings in the first, second and fourth faces of the forming tool, and/or in the male corner of the vacuum tool, and/or in the female corner of the forming tool. Where such vacuum openings are provided, then the suction force is generated by sucking gas through the vacuum openings. Alternatively the vacuum may be applied without the use of such vacuum openings.

Gas injection openings may be provided in the third and fifth faces of the forming tool. Where such gas injection openings are provided, then the gas is injected between the forming tool and the laminate charge through the gas injection openings. Alternatively the gas may be may injected without the use of such gas injection openings.

A second aspect of the invention provides a forming tool for forming a laminate charge. The forming tool has vacuum openings in first and second faces of the forming tool. The vacuum openings are arranged to create a suction force adjacent to the first and second faces of the forming tool by sucking gas away from the first and second faces of the forming tool through the vacuum openings. A vacuum port is provided in fluid communication with the vacuum openings, optionally via a vacuum manifold.

Gas injection openings are also provided in a third face of the forming tool. The gas injection openings are arranged to create a gas cushion adjacent to the third face of the forming tool by injecting gas out of the gas injection openings. These gas injection openings may comprise an array of holes, slots or grooves in the forming tool. Alternatively the forming tool may be formed by a porous material with micro-pores which provide the vacuum openings. A gas port is provided in fluid communication with the gas injection openings, optionally via a gas manifold.

Optionally a vacuum manifold couples the vacuum port to the vacuum openings, wherein the vacuum port is in fluid communication with the vacuum openings via the vacuum manifold.

Optionally a gas manifold couples the gas port to the gas injection openings, wherein the gas port is in fluid communication with the gas injection openings via the gas manifold.

A vacuum generator, such as a motorised pump, may be coupled to the vacuum port. The vacuum generator is arranged to generate the suction force by sucking the gas away from the first and second faces of the forming tool through the vacuum openings and the vacuum port.

A gas source, such as a compressed air cylinder or motorised pump, may be coupled to the gas injection port. The gas source is arranged to create the gas cushion by injecting the gas through the gas port and out of the injection openings.

The forming tool may be used, at a minimum, to form a charge into a "Z" shape, but it may also be used to form more complex shapes, such as a top-hat shape, an omega shape, or a stepped shape. Optionally the forming tool has fourth and fifth faces; a second male corner positioned between the first and fourth faces of the forming tool; a second female corner positioned between the fourth and fifth faces of the forming tool; a second set of vacuum openings in the fourth face of the forming tool, wherein the second set of vacuum openings are arranged to create a suction force adjacent to the fourth face of the forming tool by sucking gas away from the fourth face of the forming tool through the vacuum openings, and the vacuum port is in fluid communication with the second set of vacuum openings; a second set of gas injection openings in the fifth face of the forming tool, wherein the second set of gas injection openings are arranged to create a second gas cushion adjacent to the fifth face of the forming tool by injecting gas out of the second set of gas injection openings; and a second gas port in fluid communication with the second set of gas injection openings. This enables the forming tool to form a charge into a top-hat or omega shape.

The vacuum openings may only be in the first and second faces, but more preferably male corner vacuum openings are provided in the, or each, male corner of the forming tool, wherein the male corner vacuum openings are arranged to create a suction force adjacent to the male corner(s) of the forming tool by sucking gas away from the male corner(s) of the forming tool through the male corner vacuum openings, and the vacuum port is in fluid communication with the male corner vacuum openings. Similarly female corner vacuum openings may be provided in the, or each, female corner of the forming tool, wherein the female corner vacuum openings are arranged to create a suction force adjacent to the female corner(s) of the forming tool by sucking gas away from the female corner(s) of the forming tool through the female corner vacuum openings, and the vacuum port is in fluid communication with the female corner vacuum openings.

Optionally the forming tool comprises a pair of peripheral grooves, wherein each groove runs along a respective peripheral edge of the first face, round a respective peripheral edge of the male corner, along a respective peripheral edge of the second face and terminates at the female corner.

A third aspect of the invention provides apparatus for forming a laminate charge. A vacuum system is arranged to create a suction force adjacent to first and second faces of the forming tool by sucking gas away from the first and second faces of the forming tool; and a gas injection system is arranged to create a gas cushion adjacent to the third face of the forming tool by injecting gas adjacent to the third face of the forming tool. The vacuum system may create the suction force using vacuum openings in the first and second faces of the forming tool, or it may create the suction force in some other way for instance by sucking air out through a bagging film. Typically the vacuum system comprises a vacuum generator, such as a motorised pump. Similarly the gas injection system may be arranged to create the gas cushion by injecting gas out of the third face of the forming tool, for instance via gas injection openings in the third face of the forming tool; or it may create the gas cushion in some other way, for instance by injecting air under the edge of the charge from the side. Typically the gas injection system comprises a gas source, such as a compressed air cylinder or motorised pump.

A fourth aspect of the invention provides a method of forming a laminate charge. Gas (typically air) is sucked through openings in a forming surface in a sequence of stages, each stage of the sequence causing a different part of the laminate charge to be pressed against the forming surface. Generating vacuum forces in a sequence of stages, rather than simultaneously across the full extent of the forming tool, enables the charge to be pressed against the forming surface with a wave-like or progressive motion which can result in better consolidation and less wrinkling in the final product.

A fifth aspect of the invention provides a forming tool for forming a laminate charge. First and second control valves or vacuum generators can be operated individually, to independently control the suction forces generated by first and second sets of vacuum openings respectively.

The following comments apply to the method claims, and where appropriate also to the forming tools.

Optionally after the second stage of the sequence, the first and second stages of the sequence are repeated in order, so that gas is alternately sucked and then not sucked through a second set of the vacuum openings.

During the second stage of the sequence, gas may be sucked through both the first and second sets of the vacuum openings, or only through the second set of the vacuum openings.

Optionally during the first stage of the sequence the second part of the laminate charge is not in contact with the forming surface, and during the second stage of the sequence the second part of the laminate charge comes into contact with the forming surface.

The forming surface may have any shape, including a relatively flat shape or a continuously curved shape with no corners. More typically the forming surface comprises a pair of faces; and a male or female corner positioned between the pair of faces. The pair of faces may be substantially planar, or they may be formed with ramps or other non-planar features. Optionally the first set of the vacuum openings are in one of the faces, and the second set of vacuum opening are in the other of the faces. Alternatively the first set of vacuum openings are in one of the faces and the second set of vacuum openings are in the male or female corner. In either case, the sequential application of vacuum can reduce the risk of wrinkles forming at the corner and/or increase consolidation of the laminate charge at the corner. Optionally a third set of the vacuum opening are in the other of the faces, and during a third stage of the sequence gas is sucked through the third set of the vacuum openings so that a third part of the laminate charge is pressed against the other of the faces. Gas is typically not sucked through the third set of vacuum openings during the first or second stage of the sequence.

The forming surface may have a single corner only, but in a preferred embodiment the forming surface comprises first, second and third faces; a male corner positioned between the first and second faces; and a female corner positioned between the second and third faces. Optionally the first set of the vacuum openings are in the first face and/or the male corner and/or the second face, and the second set of the vacuum openings are in the female corner and/or the third face. In one embodiment the second set of the vacuum openings are in the female corner, and a third set of the vacuum openings are in the third face; and during a third stage of the sequence gas is sucked through the third set of the vacuum openings so that a third part of the laminate charge is pressed against the forming surface. Gas is typically not sucked through the third set of vacuum openings during the first or second stage of the sequence. Alternatively the first set of the vacuum openings are in the first face, the second set of the vacuum openings are in the second face, and a third set of the vacuum openings are in the third face. During a third stage of the sequence gas is sucked through the third set of the vacuum openings so that a third part of the laminate charge is pressed against the forming surface. Gas is typically not sucked through the third set of vacuum openings during the first or second stage of the sequence.

Optionally, during the first and/or second stage of the sequence, gas is injected through the third set of the vacuum openings to create a gas cushion between the forming surface and the third part of the laminate charge.

In a preferred embodiment the sequence comprises five stages in which gas is sucked through vacuum openings in the first face, the male corner, the second face, the female corner and then the third face, in that order.

The (or each) vacuum generator may be a pump such as a motorised pump, or any other suitable source of vacuum.

In the case of the forming tool, the first and second control valves can be operated individually, to independently control the suction forces generated by the first and second set of vacuum openings respectively. In other words the first and second control valves can be operated independently of each other. Optionally the control valves are ball valves, or any other valve with an "on" setting and an "off" setting.

In the case of the forming tool, the first and second vacuum generators can be operated individually, to independently control the suction forces generated by the first and second set of vacuum openings respectively. In other words the first and second vacuum generators can be operated independently of each other. For instance the first and second vacuum generators may be turned on and off to independently control the suction forces, or the first and second vacuum generators may each have a respective control valve, such as a ball valve, which can be turned on and off to independently control the suction forces.

Optionally the second vacuum generator can be switched between a vacuum generation mode in which it sucks gas away from the forming surface through the second set of vacuum openings, and a gas injection mode in which it injects gas (typically air) through the second set of vacuum openings so as to generate a gas cushion adjacent to the forming surface.

The following comments apply to all aspects of the invention.

The faces of the forming tool may be substantially planar, or they may be formed with ramps or other non-planar features.

The openings may comprise an array of holes, slots or grooves in the forming tool. Alternatively the forming tool may be formed by a porous material with micro-pores which provide the openings.

Optionally an impermeable sheet, such as a bagging film, is provided which can be fitted over the forming tool.

The impermeable sheet may be a bagging film, a membrane, or any other impermeable and flexible sheet material. The impermeable sheet may be tensioned over the forming tool. The impermeable sheet may typically be tensioned in a direction away from a top edge of the forming tool. The tension applied to the impermeable sheet may typically be an axial tension. The tension may be applied manually. The tension may be applied mechanically. One method in which the impermeable sheet may be tensioned mechanically is via a cam arrangement. The impermeable sheet may stretch when tension is applied. The tension may be released during the forming operation, typically when the charge has been formed around the male corner of the forming tool. The tension may be released by enabling the cam arrangement to rotate as the sheet forms around the tool. The impermeable sheet may be clamped. The impermeable sheet may typically be clamped against the forming tool. The forming tool may be bigger than the charge. The impermeable sheet may be clamped manually. The impermeable sheet may be clamped mechanically via a clamping arrangement. The impermeable sheet may be releasably clamped. The clamp release mechanism may be automated. One method of mechanically clamping the impermeable sheet is via a cam arrangement wherein the cam clamps the impermeable sheet. Alternatively the impermeable sheet may be clamped by releasable blocks. The clamping arrangement may be retractable. The impermeable sheet may be clamped and tensioned simultaneously. The clamping force is typically applied in a different direction to the tension force. The clamping force may be applied in a direction perpendicular to the third forming tool surface. The impermeable sheet may be clamped on an opposite surface of the forming tool.

The laminate charge comprises a stack of two or more plies, typically ten or more plies.

The laminate charge may comprise a stack of non-fibrous plies, but typically it comprises a stack of fibre plies. The fibres of the fibre plies may be carbon fibres, or fibres made from any other suitable material. Fibre plies are preferred because they can have relatively high porosity, which is beneficial to enable the flow of gas through the charge.

The fibre plies may be prepreg plies, each prepreg ply comprising a layer of fibres impregnated with a matrix material. However more preferably the laminate charge comprising a stack of dry-fibre plies, optionally containing a binder. Such dry-fibre plies have a higher degree of porosity than prepreg plies, which is beneficial to enable the flow of gas through the charge. Optionally the stack of dry-fibre plies includes resin film plies interleaved with the dry-fibre plies, as a precursor for a resin-film-infusion process.

Optionally the method further comprises infusing the dry-fibre plies of the laminate charge with a liquid matrix material after the impermeable sheet has pressed the third part of the laminate charge against the forming tool. This may be achieved by a resin transfer moulding process, a resin film infusion process, or any other suitable method.

The dry-fibre plies may be infused on the forming tool, but more typically they are infused on an infusion tool. The infusion tool may have the same male profile as the forming tool, but more typically the method further comprises removing the laminate charge from the forming tool after the impermeable sheet has pressed the third part of the laminate charge against the forming tool; placing the laminate charge on an infusion tool with a female corner of the infusion tool positioned between the first part of the laminate charge and the second part of the laminate charge, and a male corner of the infusion tool positioned between the second part of the laminate charge and the third part of the laminate charge; and infusing the dry-fibre plies of the laminate charge on the infusion tool with a liquid matrix material.

An infusion tool may be provided, with an inverted complementary shape to the forming tool. Optionally the infusion tool has first, second and third faces, a female corner positioned between the first and second faces of the infusion tool, and a male corner positioned between the second and third faces of the infusion tool.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
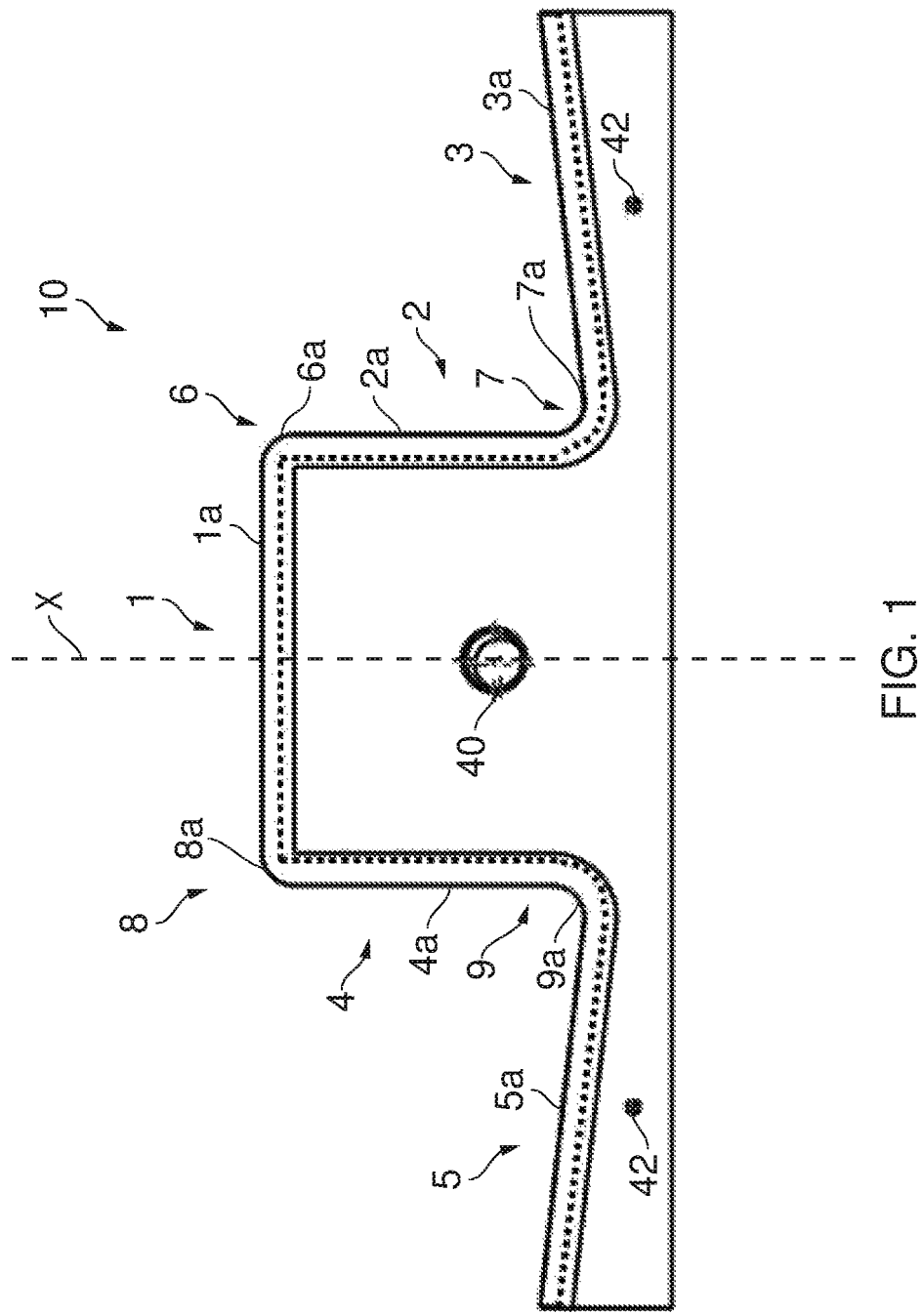
FIG. 1 is a side view of a forming tool.
Figure 3:
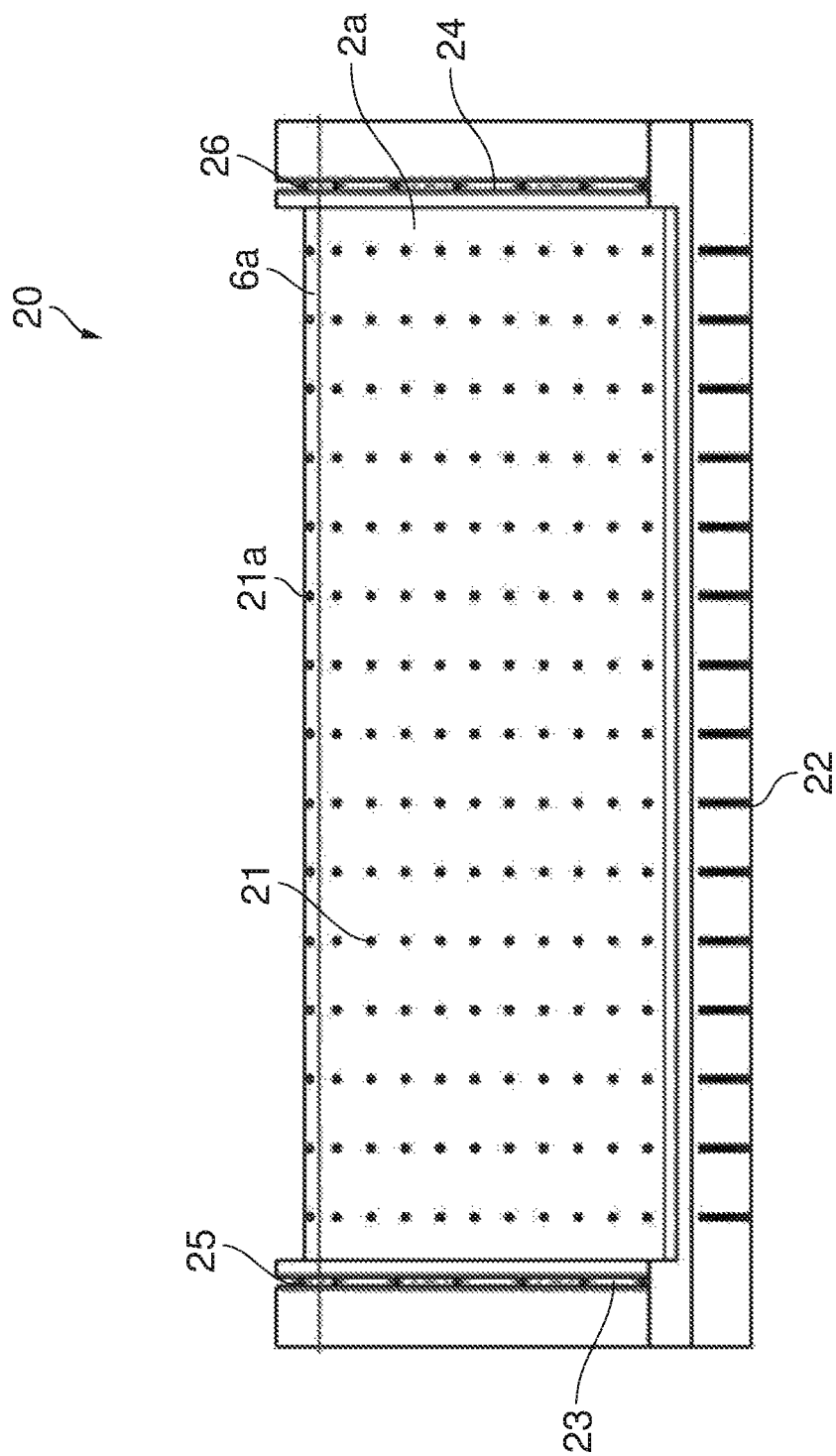
FIG. 3 is a front view of the forming part.
Figure 4:
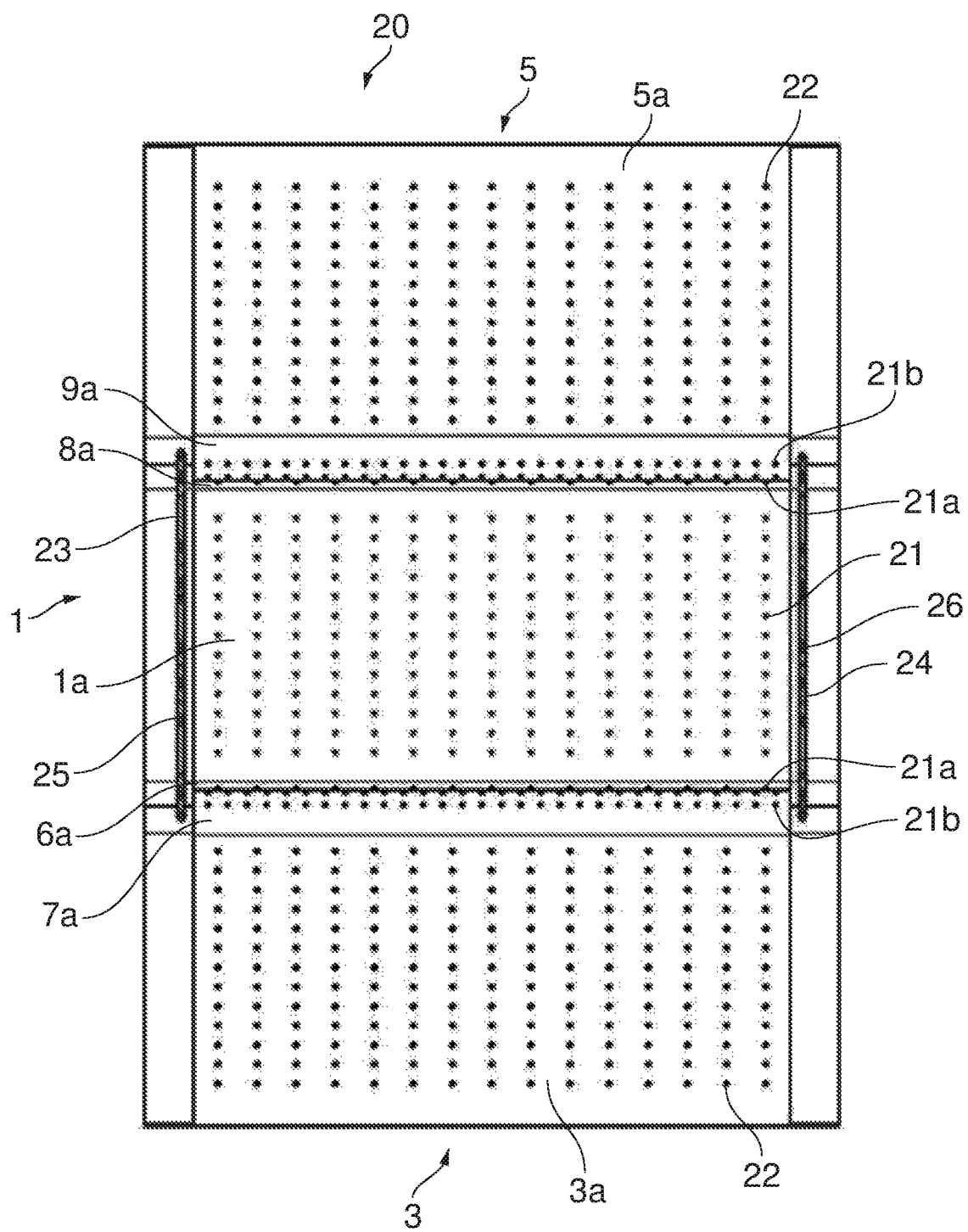
FIG. 4 is a top view of the forming part.

A forming tool 10 for forming a laminate charge is shown in FIG. 1. The forming tool comprises a forming part 20 shown in FIGS. 2-4, fitted onto a base 30 shown in FIGS. 5-7.

The forming part 20 has five parts 1-5 forming an "omega shape". The five parts 1-5 are connected by curved corner parts 6-9. Each part 1-5 has a respective outer face 1a-5a which is approximately planar, and each corner part 6-9 has a curved outer face 6a-9a forming either a male corner or a female corner. Thus a first male corner 6a is positioned between the first and second faces 1a, 2a of the forming part; and a first female corner 7a is positioned between the second and third faces 2a, 3a of the forming part. The other half of the forming part 20 is a mirror image, as indicated by mirror plane X in FIG. 1, with a second male corner 8a positioned between the first and fourth faces 1a, 4a of the forming part; and a second female corner 9a positioned between the fourth and fifth faces 4a, 5a of the forming part 10.

Figure 2:
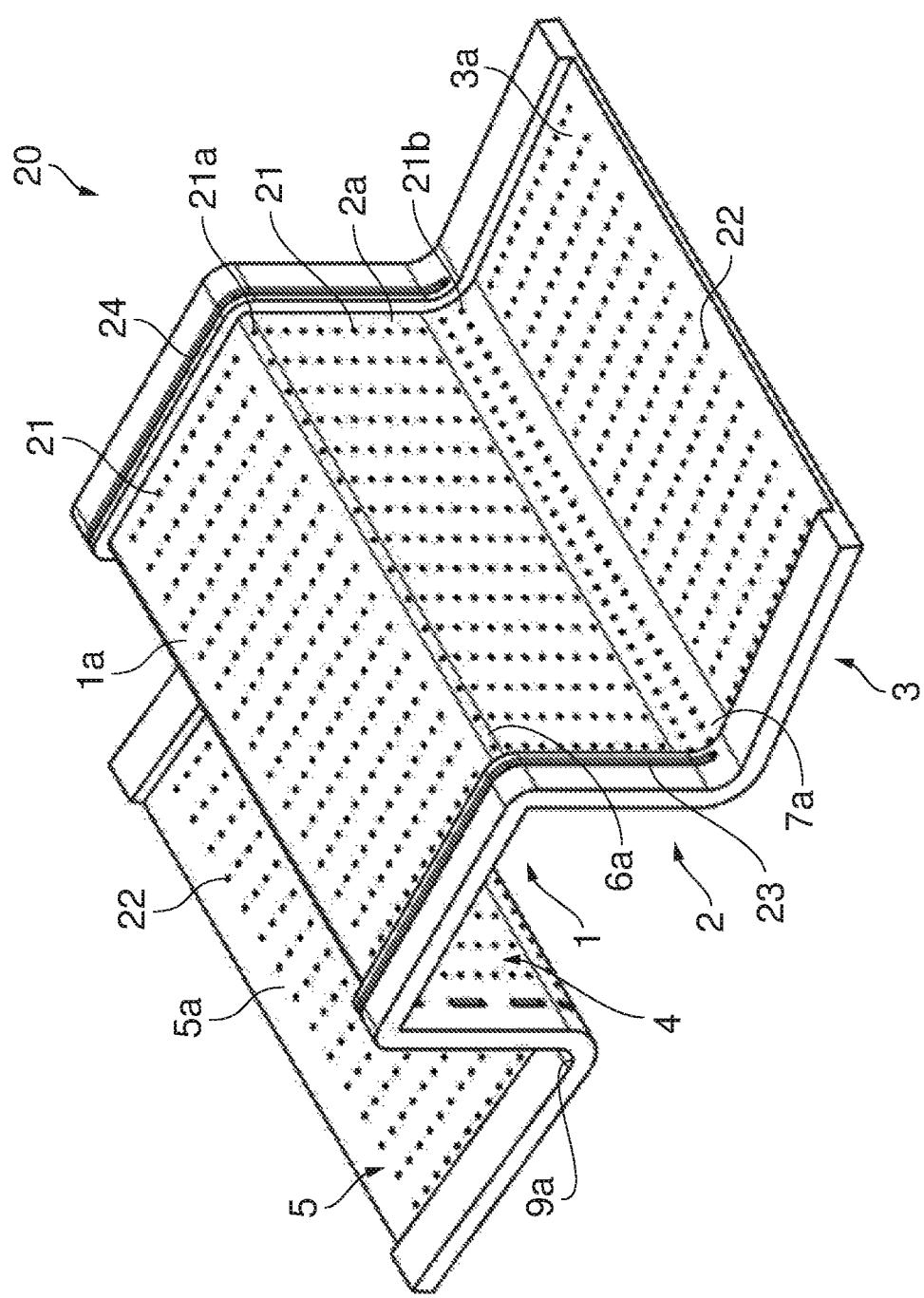
FIG. 2 is a perspective view of a forming part of the forming tool.

As shown in FIG. 2, the forming part 20 is perforated to form arrays of vacuum holes 21 in the first, second and fourth faces 1a, 2a, 4a of the forming part 10, and similar arrays of gas injection holes 22 in the third and fifth faces 3a, 5a of the forming part 10. Male corner vacuum holes 21a are also provided in the male corners of the forming part, along with female corner vacuum holes 21b in the female corners of the forming part. The vacuum holes 21, 21a, 21b are arranged to create a suction force adjacent to the faces 1a, 2a, 4a of the forming tool as will be described in further detail below. Similarly the gas injection holes 22 are arranged to create gas cushions adjacent to the faces 3a, 5a of the forming tool as will be described in further detail.

A pair of peripheral grooves 23, 24 run along respective peripheral edges of the faces 1a, 2a, 4a, and respective peripheral edges of the first and second male corners 6a, 8a. The grooves 23, 24 have vacuum holes 25, 26 and they terminate at the female corners 7a, 9a.

Figure 5:
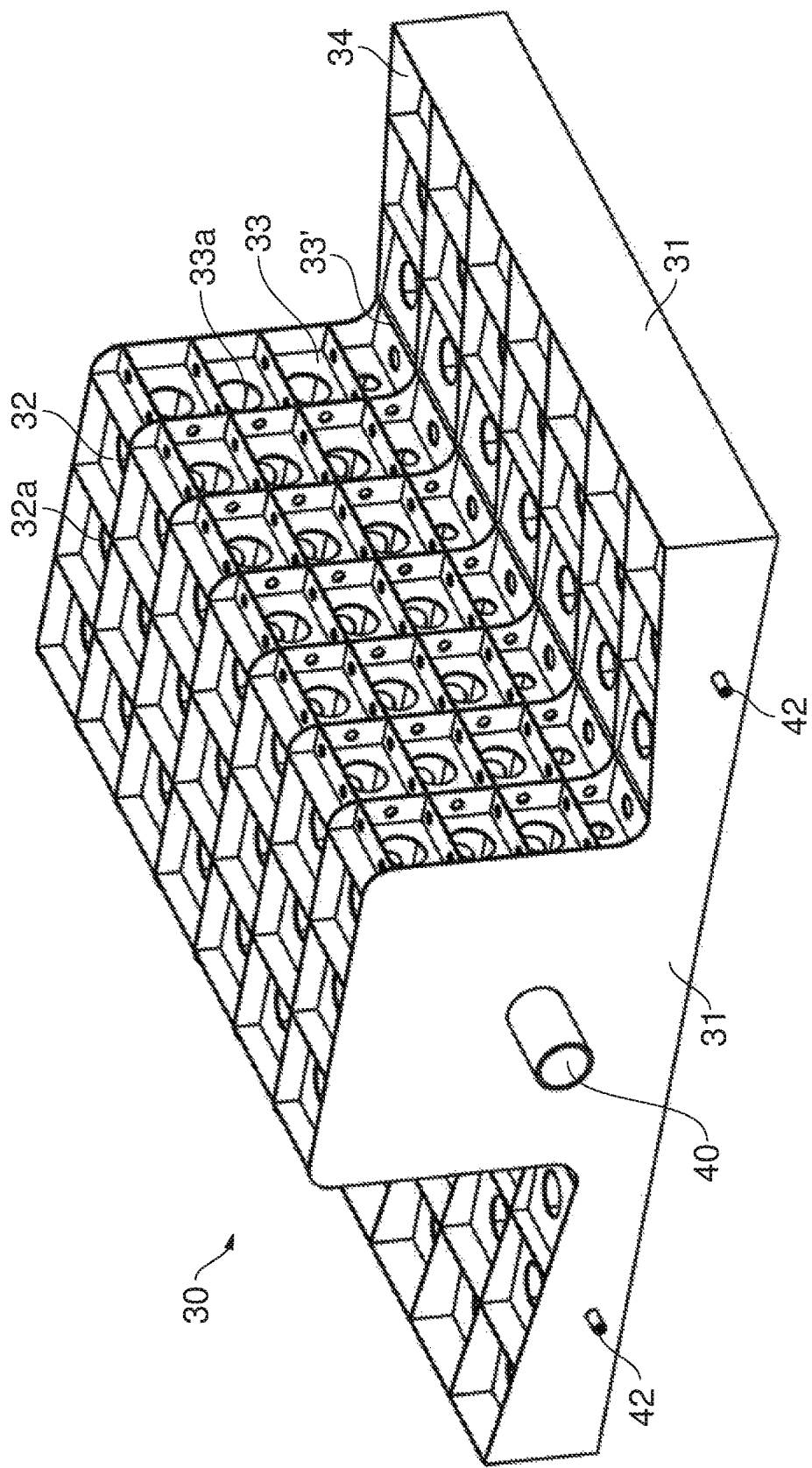
FIG. 5 is a perspective view of the base.
Figure 6:
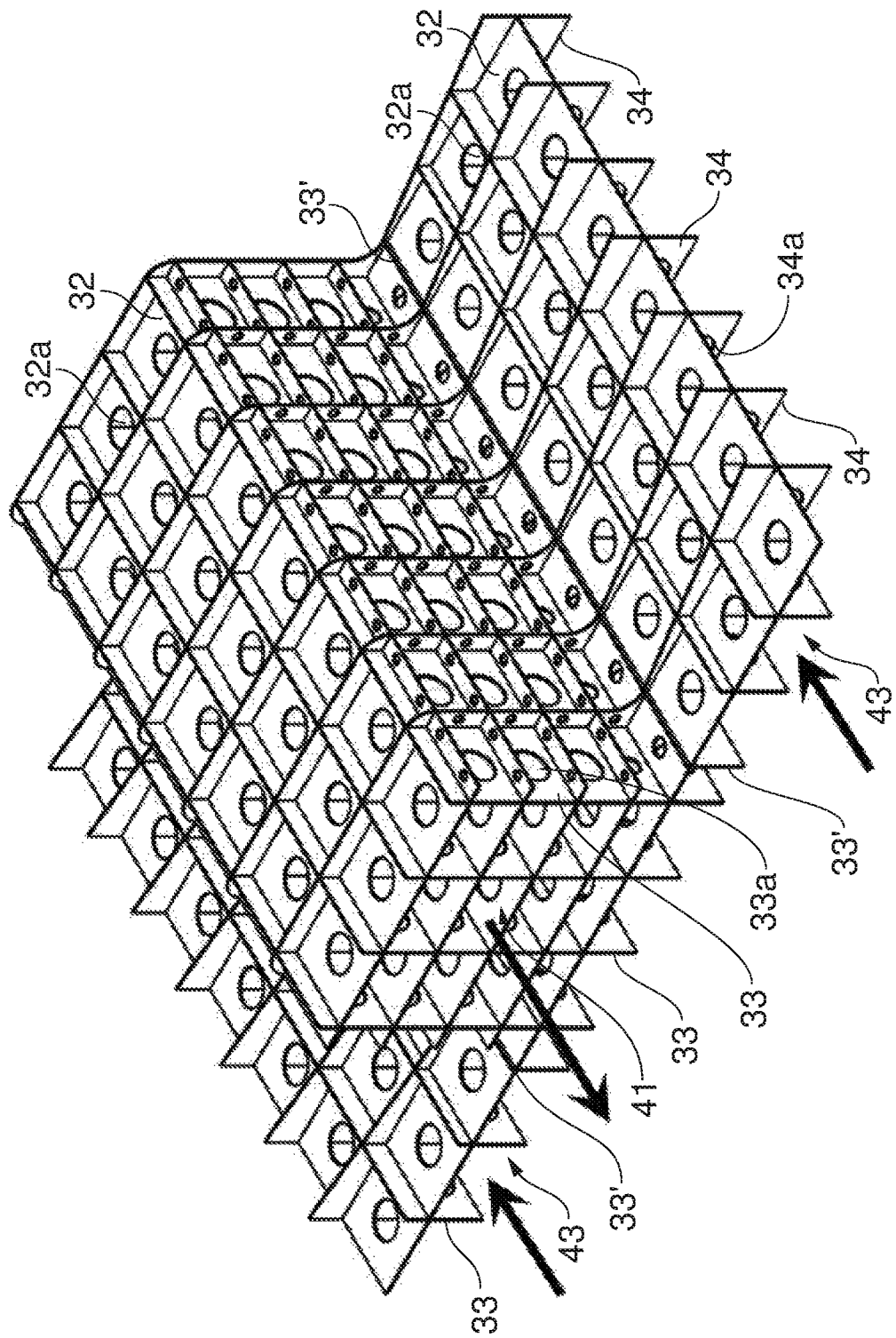
FIG. 6 is a perspective view of the internal structure of the base.

The base 30 comprises a support network shown in FIG. 6, and a mounting structure 31 shown in FIG. 5. The support network comprises five horizontal plates 32, ten axial ribs 33, 33' running parallel with the corners 6a-9a, and seven lateral ribs 34 running transverse to the corners 6a-9a. The plates 32 and lateral ribs 34 are perforated with holes 32a and 34a respectively. Eight of the axial ribs 33 are perforated with holes 33a in a similar fashion, but two of the axial ribs (labelled 33') are non-perforated—that is, they are continuous with no such holes. These continuous ribs 33' will be referred to below as dividing ribs 33'.

Figure 7:
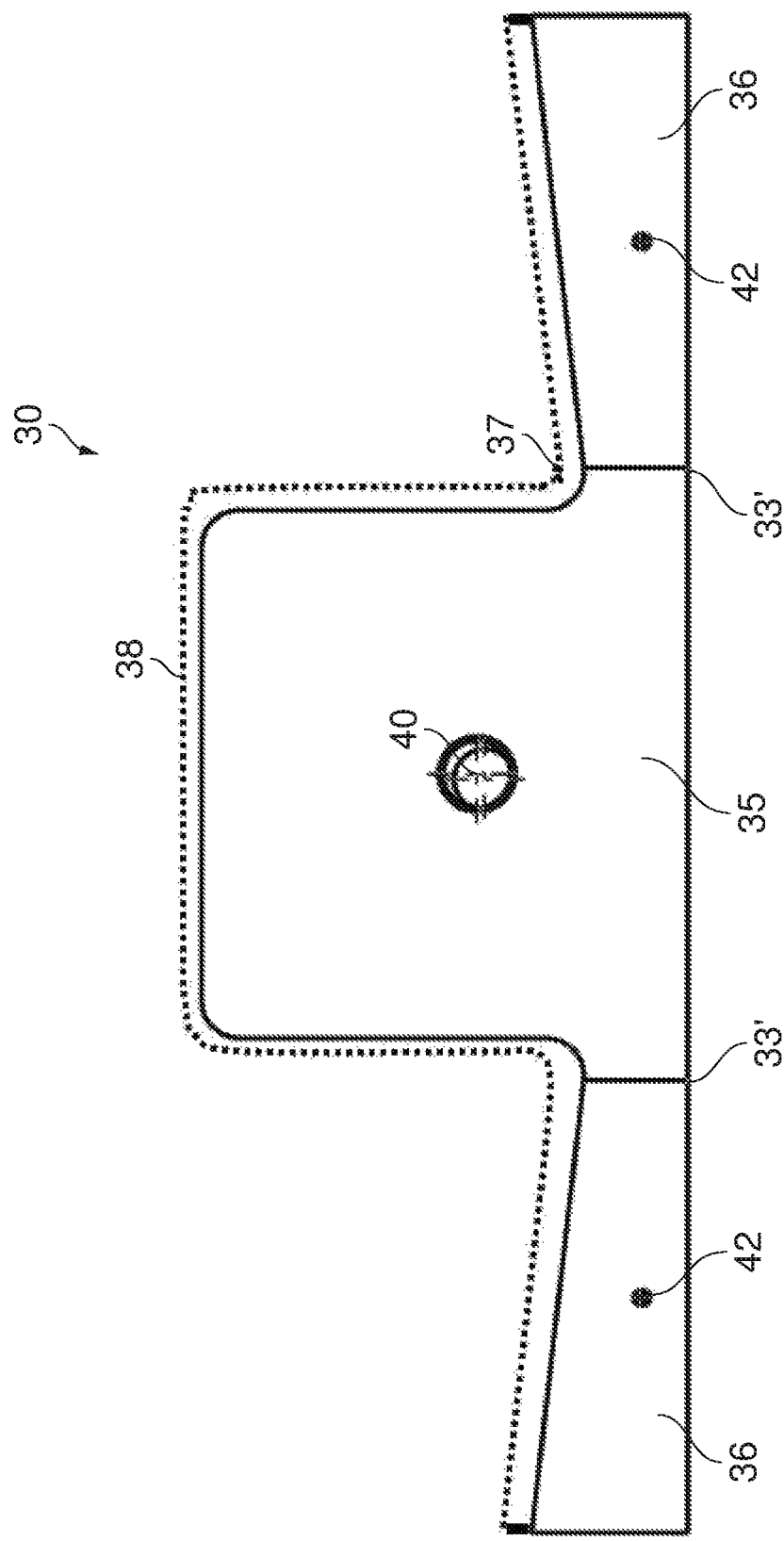
FIG. 7 is a side view of the base.

FIG. 7 is a side view of the base 30 with the two dividing ribs 33' shown. The dividing ribs 33' and the mounting structure 31 segment the base 30 into three chambers labelled in FIG. 7: a central vacuum chamber 35, and a pair of positive pressure chambers 36. The perforated ribs 32-34 enable gas to flow across the ribs within the chambers 35, 36; and the dividing ribs 33' prevent gas from flowing between the chambers 35, 36.

Figure 8:
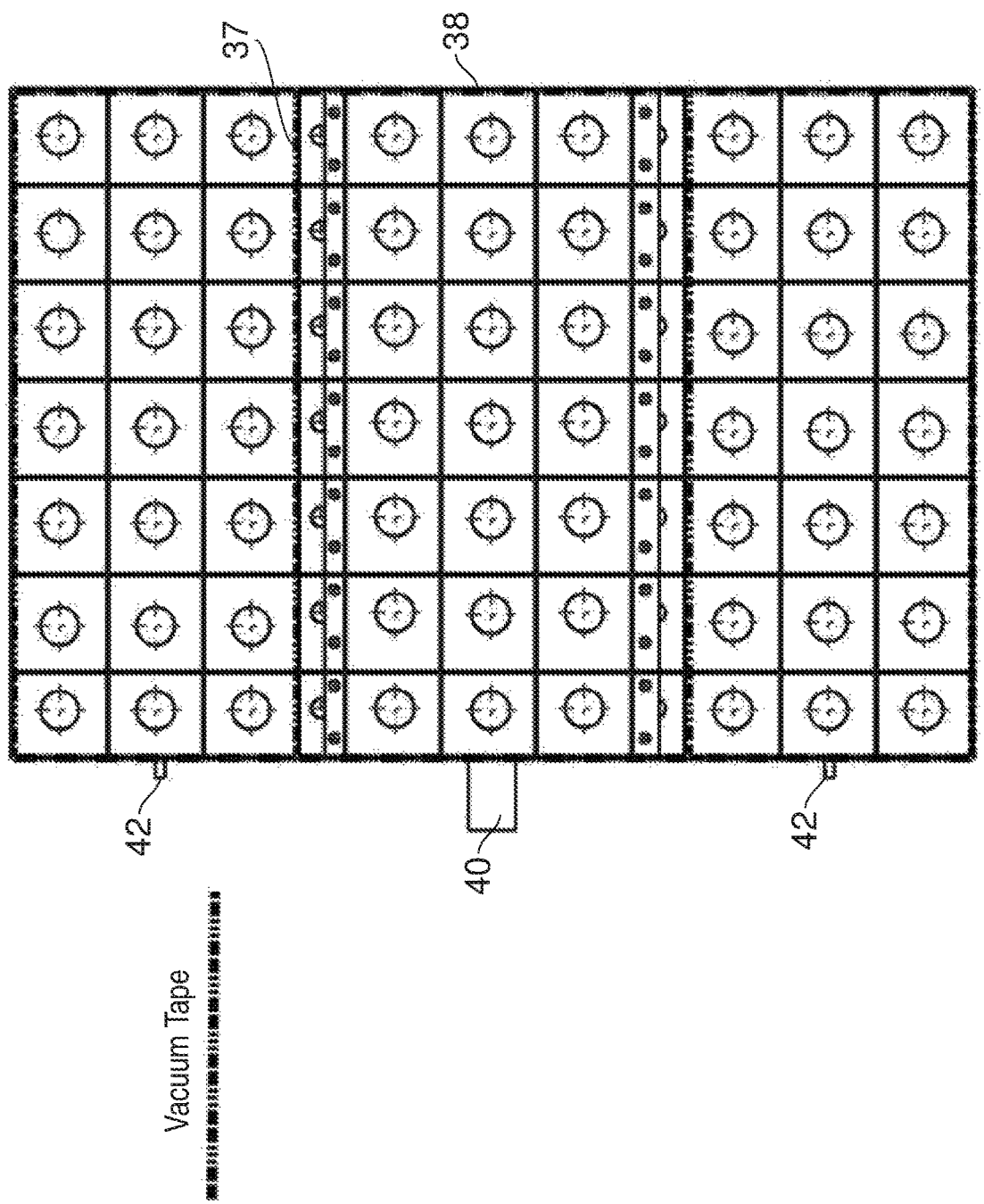
FIG. 8 is a top view of the base.

Before the forming part 20 is fitted onto the base 30, vacuum tape 37 shown in FIGS. 7 and 8 is fitted along the top edges of the dividing ribs 33'. Similarly a frame of vacuum tape 38 is fitted around the top edge of the mounting structure 31. The vacuum tape 37, 38 seals the interface with the forming part 20.

A vacuum port 40 shown in FIG. 5 passes through the mounting structure 31 and into a central channel 41 of the vacuum chamber as shown in FIG. 6. The vacuum port 40 is in fluid communication with the vacuum holes 21, 21a, 21b, 25, 26 via the vacuum chamber 35. The central channel 41 acts as vacuum manifold coupling the vacuum port 40 to the vacuum holes, i.e. the vacuum port 40 is in fluid communication with the vacuum holes via the vacuum manifold 41.

Gas ports 42, also shown in FIG. 5, pass through the mounting structure 31 and into central channels 43 of the positive pressure chambers as shown in FIG. 6. The gas ports 42 are in fluid communication with the gas injection holes 22 via the positive pressure chamber 36. Each central channel 43 acts as a gas manifold coupling a respective gas port to the gas injection openings, i.e. the gas port 42 is in fluid communication with the gas injection openings via the gas manifold 43.

Figure 9:
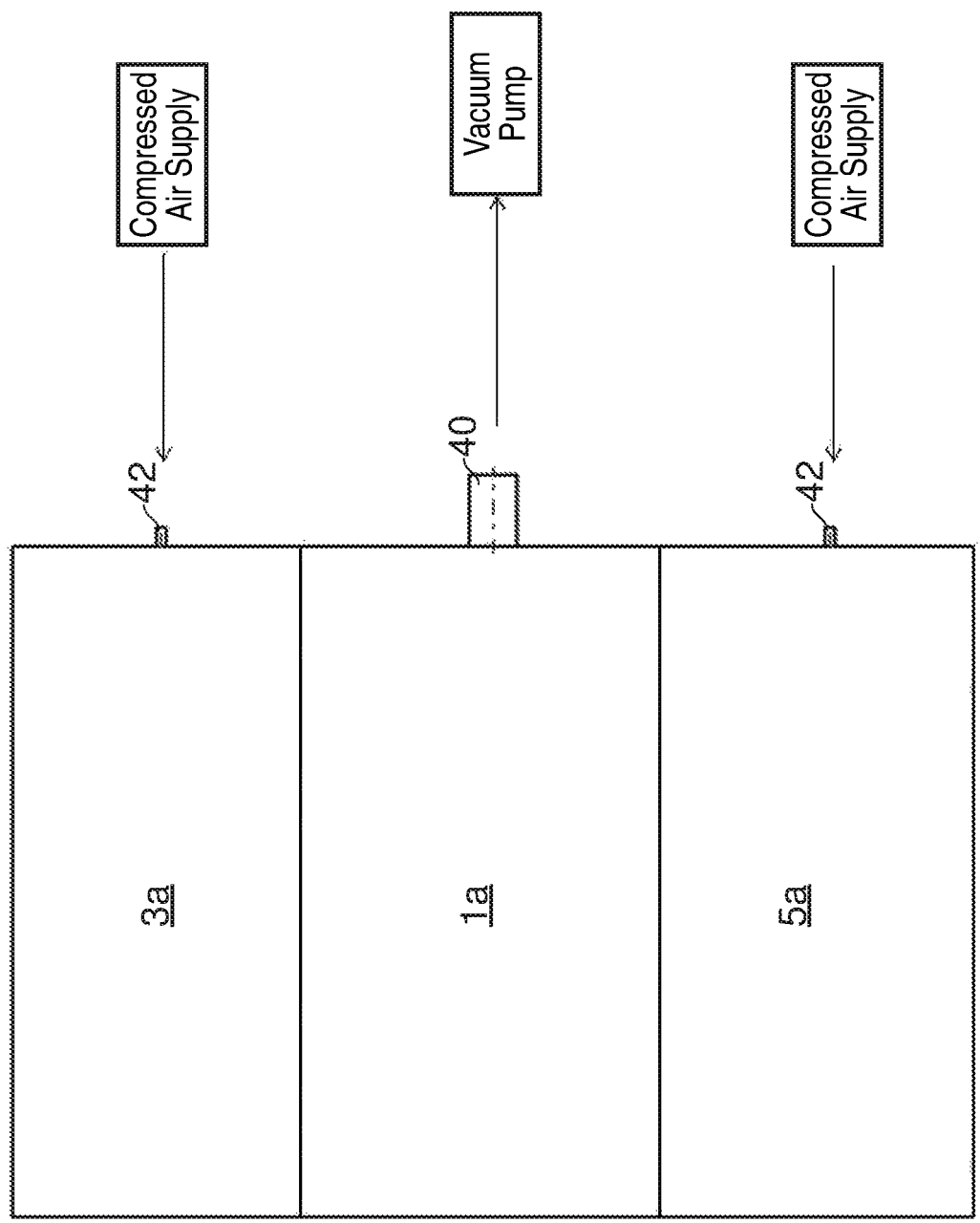
FIG. 9 is a schematic view of the forming tool coupled to air and vacuum supplies.

In order to operate the forming tool, a vacuum pump shown in FIG. 9 is coupled to the vacuum port 40. The vacuum pump generates the suction force by sucking the gas away from the faces 1a, 2a, 4a of the forming tool through the vacuum holes and the vacuum port 40. A suitable vacuum pump is part no. SGBL-FU 335-250-ER available from Schmalz. This is a frequency-regulated vacuum blower with continuously adjustable suction volume.

Similarly, compressed air supplies shown in FIG. 9 are coupled to the gas ports 42. Each gas source creates a respective gas cushion, as described in further detail below, by injecting compressed air through the gas port 42 and out of the gas injection openings. The compressed air supplies may be compressed gas canisters, or compressed gas pumps for example.

Figure 10:
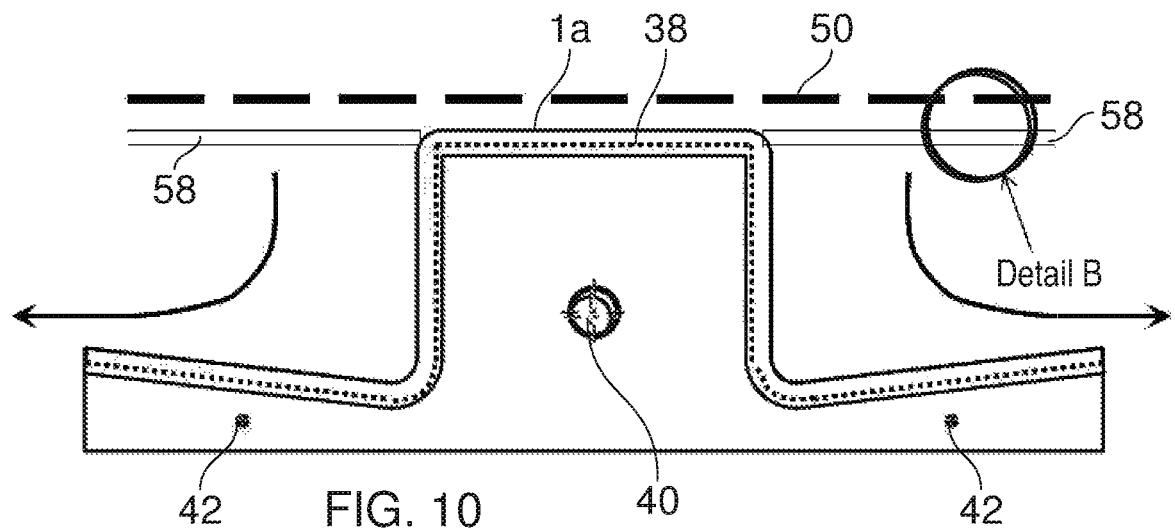
FIG. 10 is a side view showing a first step in a method of forming a laminate charge.
Figure 11:
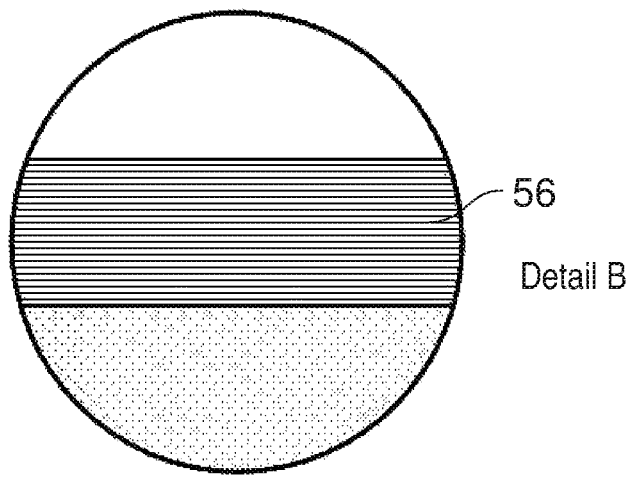
FIG. 11 is a magnified cross sectional view showing the charge.

FIG. 10 shows a first step in a method of forming a laminate charge using the apparatus previously described. A laminate charge 50 is laid up on a horizontal lay-up surface provided by the (upper) first surface 1a of the forming tool and a pair of retractable lay-up tables 58. The laminate charge comprises a stack of dry-fibre plies 56 shown in FIG. 11 which are laid up one-by-one on the horizontal lay-up surface. The number of plies 56 typically varies between about 15 plies (for a 3 mm charge) up to about 120 plies (for a 40 mm charge). Each ply comprises a knitted or woven fabric of carbon-fibres or other fibres, typically stitched by tricot stitching although other stitching methods are possible such as pillar stitching. Each ply contains binder material and/or a toughener material, typically in the form of a powder or a veil, but it is "dry" in the sense that it is not pre-impregnated with resin so has a relatively open porous structure. Optionally the stack includes a peel ply, or any other porous membrane such as a breather layer, at the top and/or bottom of the stack.

Figure 12:
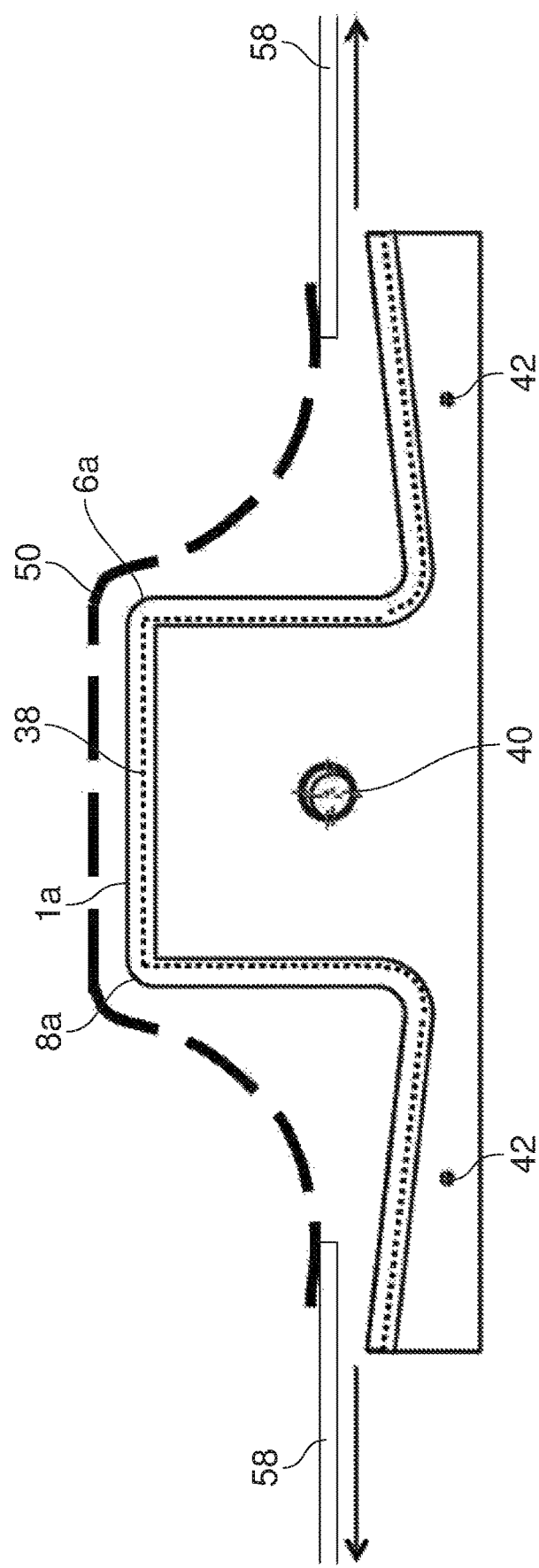
FIG. 12 is a side view of the method step of removing the lay-up tables.
Figure 13:
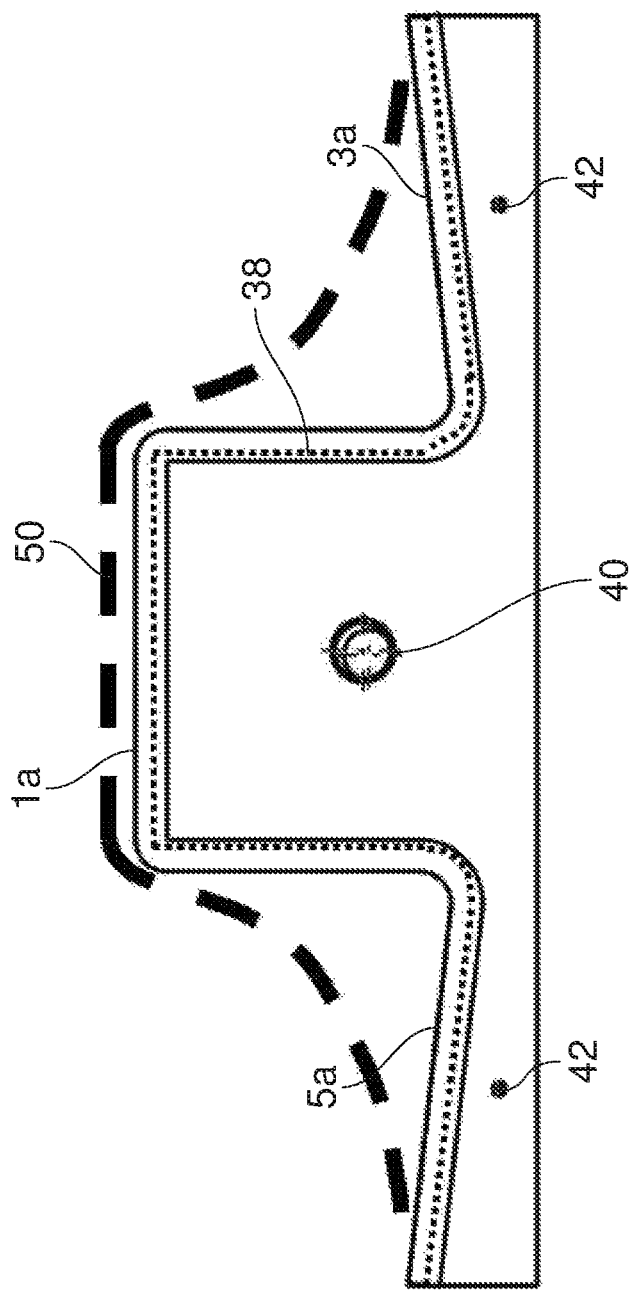
FIG. 13 is a side view of the forming tool and charge after the retractable lay-up tables have been removed.
Figure 14:
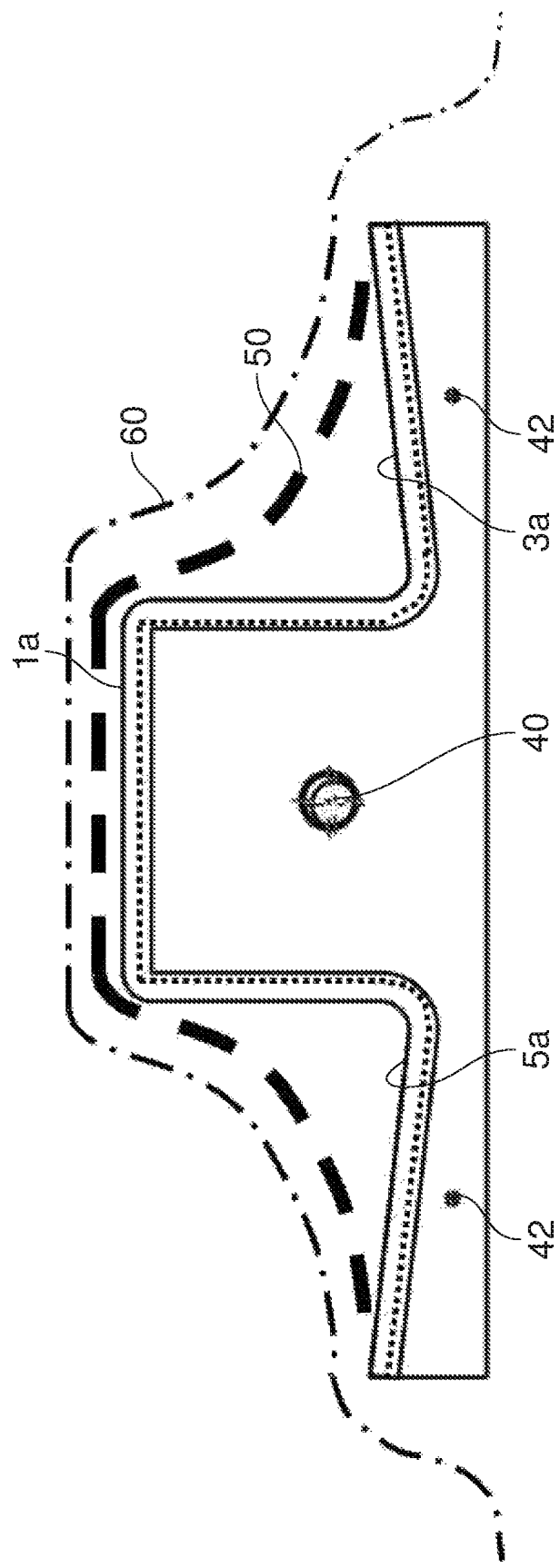
FIG. 14 is a side view showing the method step of applying the bagging film.

The retractable lay-up tables 58 are then lowered, following the paths indicated by arrows in FIG. 10, so that the charge 50 drapes down under its own weight over the male corners 6a, 8a as shown in FIG. 12. FIG. 13 shows the charge 50 after the retractable lay-up tables 58 have been removed, and the edges of the charge 50 are in contact with the outer faces 3a, 5a of the forming tool. Next a bagging film 60 is fitted over the forming tool as shown in FIG. 14. Note that the edges of the bagging film 60 are not sealed.

Figure 15:
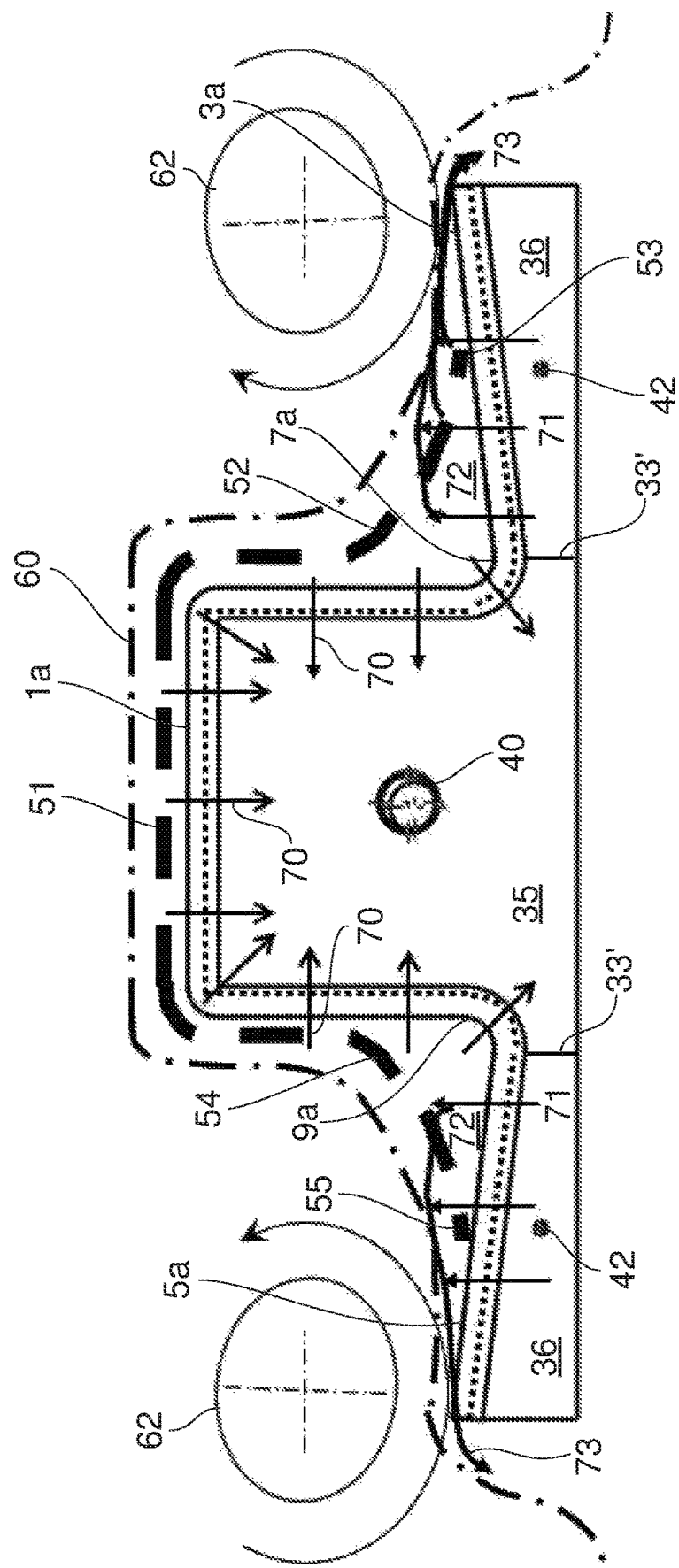
FIG. 15 is a side view showing the forming step.

In a forming step shown in FIG. 15, the vacuum pump is turned on to generate a suction force between the forming tool and the bagging film 60. Tension is applied to the bagging film 60 in a direction down and away from face 1a so that the bagging film is tensioned over the plies 51 at the face 1a. The bagging film is then clamped around the edge of the outer faces 3a and 5a, ensuring that the flanges 53 and 55 are not clamped between the clamp and the tool. The bagging film can be clamped manually or via a clamping arrangement 62 at one or more positions along the length of the edge of the outer faces 3a and 5a, as illustrated in FIG. 15. The suction force between the tool and the bagging film 60 causes the bagging film 60 to press the laminate charge around and against the male corners of the forming tool. The clamping arrangement 62 increases the tension acting at the male corner region, enabling air present between the plies 51 adjacent surface 1a to be washed out preferentially to air present between the plies adjacent other surfaces of the charge being washed out during the forming process, which achieves a bulk reduction in the part and also prevents wrinkling at the male corners. As the suction force causes the bagging film to press the laminate charge parts 52 and 54 against faces 2a and 4a, the clamping arrangement is allowed to rotate which releases the bagging film, allowing the bagging film to press the laminate charge around and into the female corners of the forming tool. This vacuum force is indicated by inwardly directed arrows 70 in FIG. 15 which also indicate the negative flow of air into the vacuum chamber 35 via the vacuum holes. The step of clamping the bagging film may be omitted where desired, e.g. for thinner plies stacks which have less bulk.

The charge 50 has first, second, third, fourth and fifth parts numbered 51 to 55 respectively. The male corners 6a, 8a of the forming tool are positioned between the first and second parts 51, 52 of the charge, and between the first and fourth parts 51, 54 of the charge respectively. The female corners 7a, 9a of the forming tool are positioned between the second and third parts 52, 53 of the charge, and between the fourth and fifth parts 54, 55 of the charge respectively. The third and fifth parts 53, 55 of the charge will be referred to below as flanges 53, 55.

During the forming step, the compressed air supplies are also turned on so that compressed air 71 is injected between the forming tool and the flanges 53, 55 of the charge to create gas cushions 72 between the forming tool and the flanges 53, 55. Each gas cushion 72 inhibits its associated flange 53, 55 from becoming clamped against the forming tool as the charge is pressed into the female corners 7a, 9a of the forming tool. The gas cushions 72 effectively lift up the flanges 53, 55 so that there is relatively little friction between the flanges 53, 55 and the forming tool. The flanges 53, 55 may be completely lifted up by the gas cushion so that there is no contact with the forming tool, although more typically the flanges will perform a flapping or rippling motion causing intermittent contact with the forming tool.

The relatively high porosity of the dry-fibre charge 50 means that some of the air from each gas cushion 72 exits by passing through the flange 53, 55 of the charge and then out from under the bagging film, as indicated by arrows 73 in FIG. 15. Note that the bagging film 60 is not sealed against the forming tool, so the compressed air can escape easily via this route. Some of the compressed air will also exit the gas cushions 72 by flowing past and underneath the edge of the flange 53, 55 and out from under the bagging film. Some of the compressed air will also flow directly from the gas injection holes and into the vacuum chamber 35 via the vacuum holes. This will slightly impede the efficiency of the vacuum pump, but such a drop of efficiency has been found to be acceptable.

Figure 16:
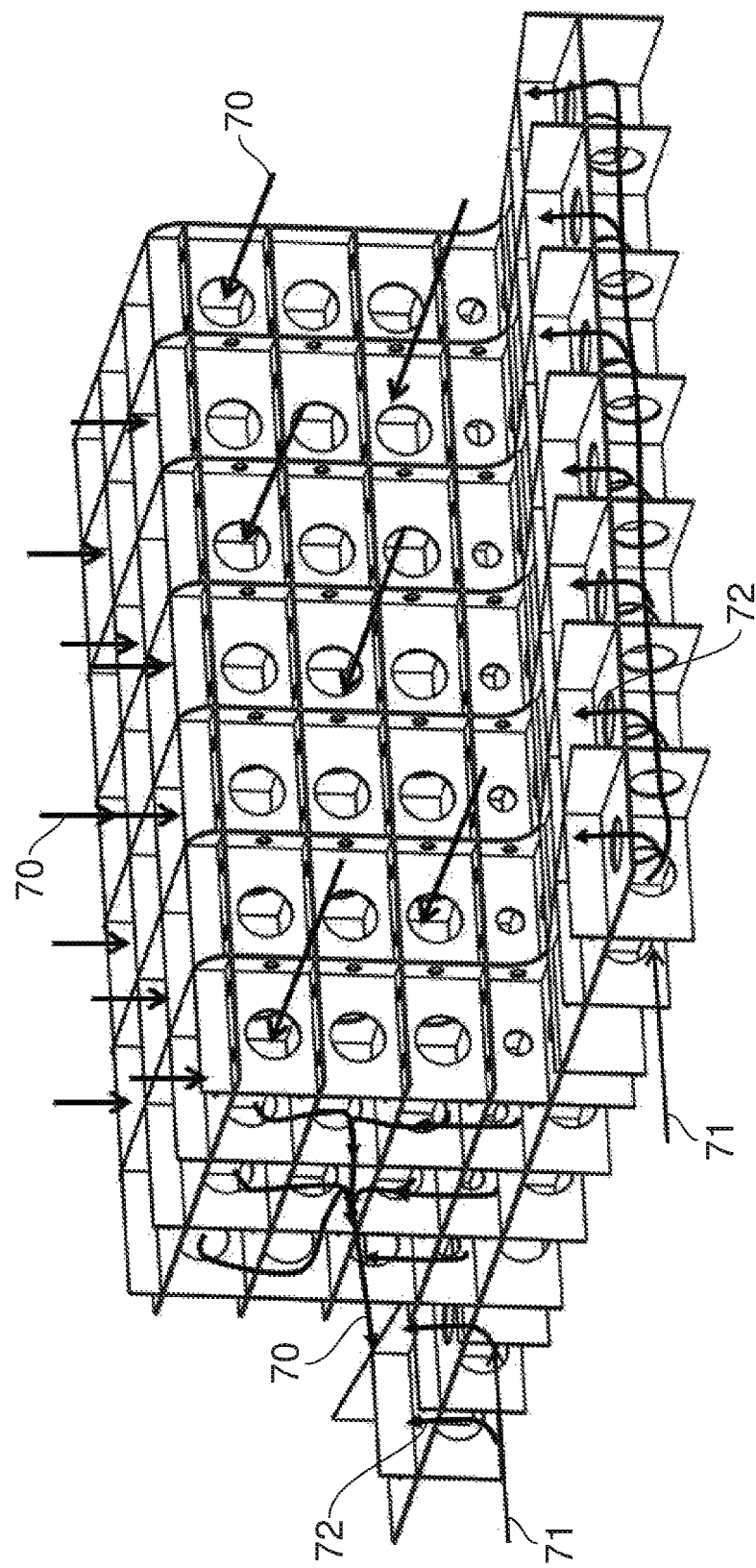
FIG. 16 is a perspective view showing the airflow within the internal structure of the base during the forming step.

FIG. 16 shows the flow of air in and out of the network of ribs during the forming step described above. Optionally the flow through the ribs can be controlled by fitting permeable diffusing cloth over selected ones of the holes in the ribs, for instance to achieve a more even flow distribution or to slow down the flow.

The vacuum holes 25, 26 pull the bagging film down into the peripheral grooves 23, 24. This helps the bagging film 60 to be held securely against the top of the forming tool and seals this particular interface between the bagging film and the forming tool.

Figure 17:
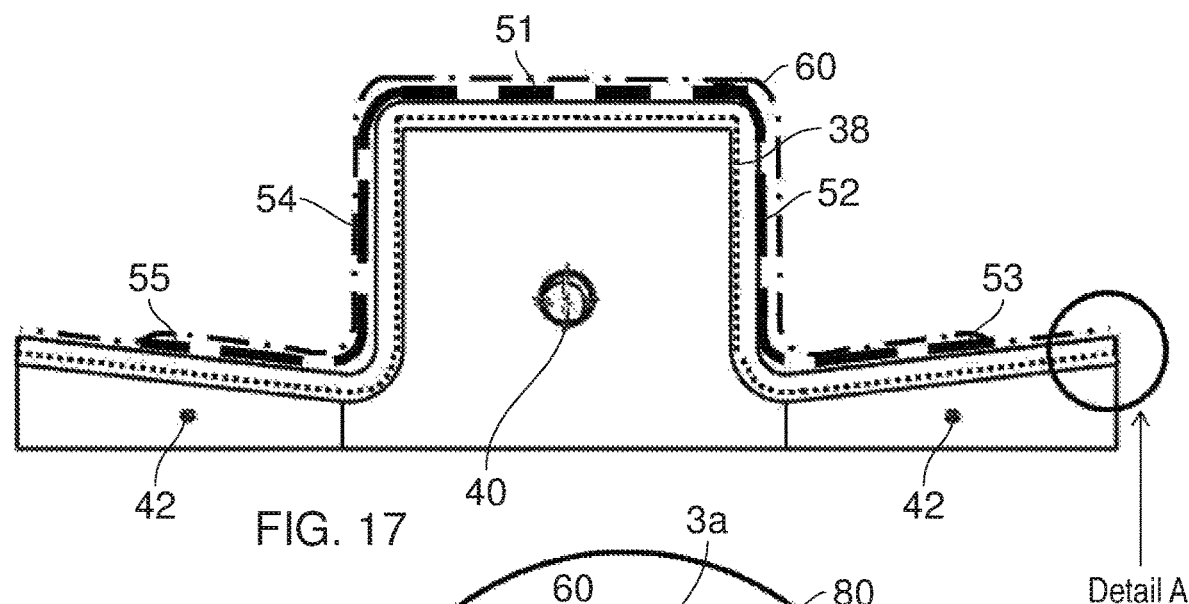
FIG. 17 is a side view of the forming tool and charge at the end of the forming step.

FIG. 17 shows the charge at the end of the forming step. The low friction caused by the gas cushions 72 has enabled the flanges 53, 55 to slide or float easily into the female corners of the forming tool without wrinkling. There will also be a certain degree of relative sliding motion between the dry-fibre plies during the forming step, and this may be assisted by the action of the gas cushions which help to loosen the stack and reduce inter-ply shear forces.

Figure 18:
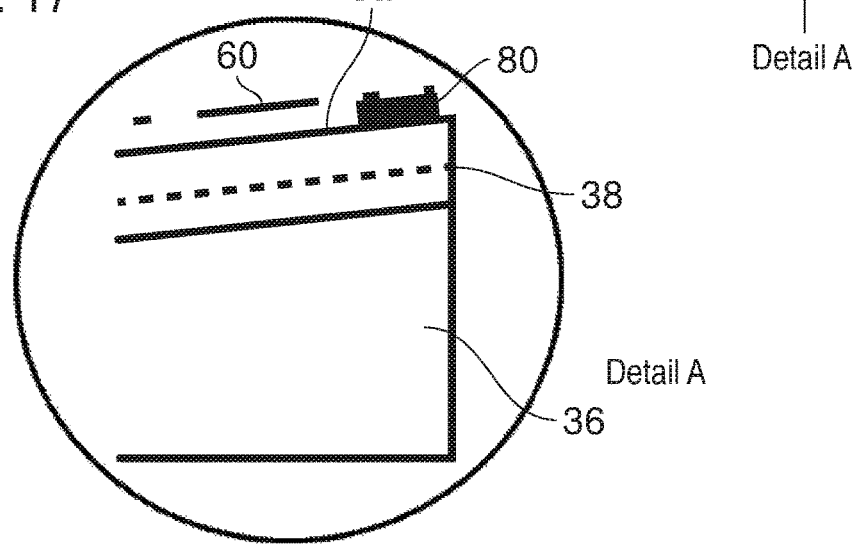
FIG. 18 is a magnified cross sectional view showing the bagging film sealed to the forming tool.
Figure 19:
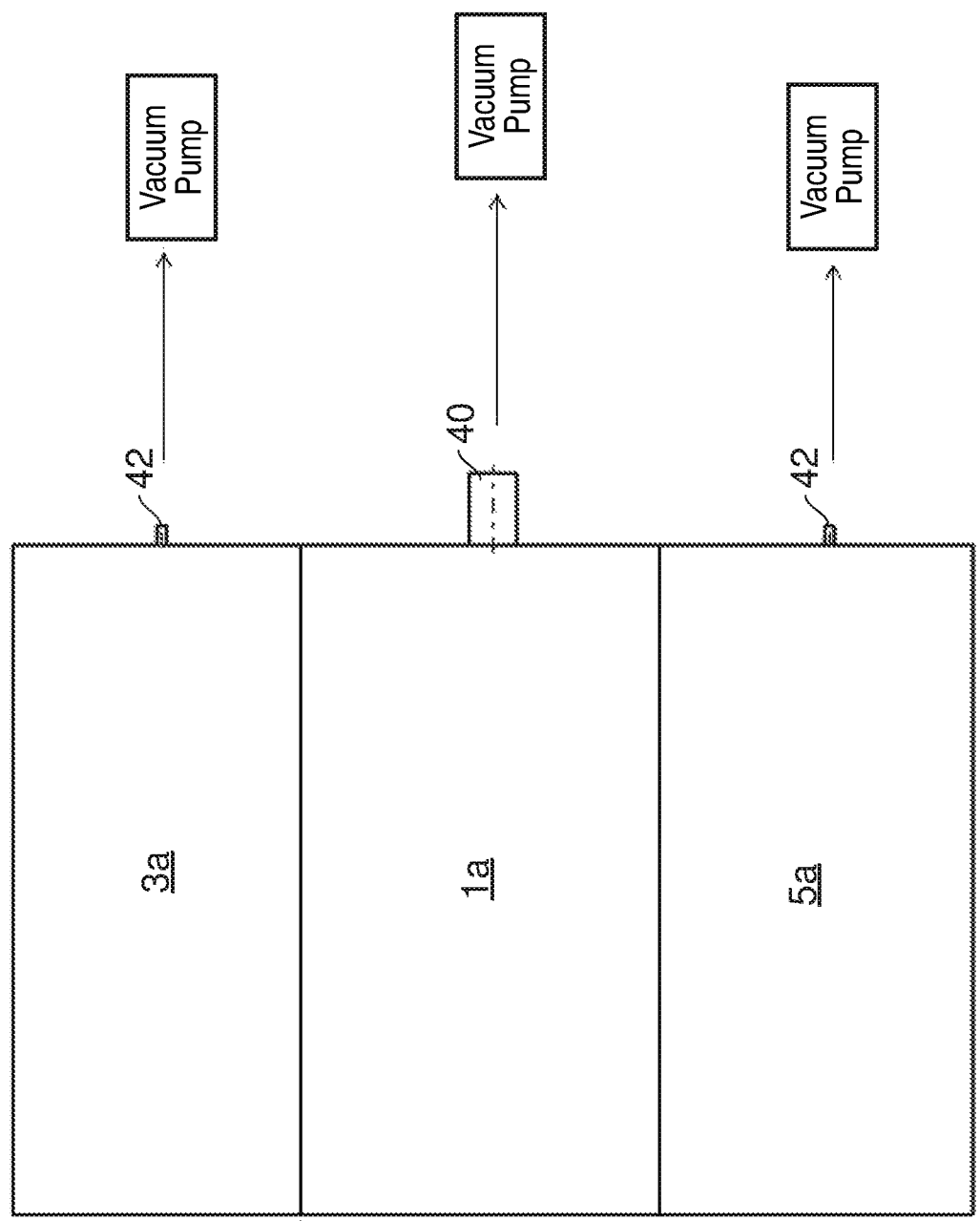
FIG. 19 is a schematic view of the forming tool coupled to three vacuum pumps.
Figure 20:
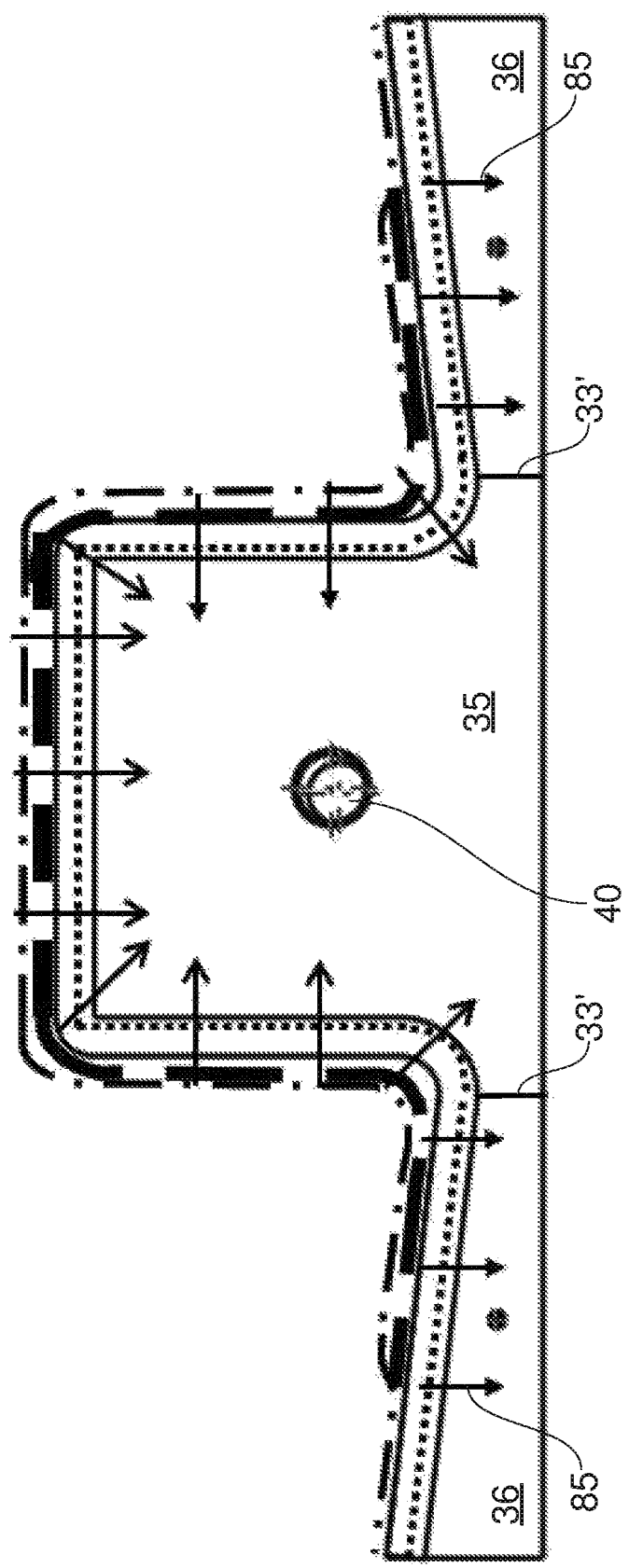
FIG. 20 is a side view of the forming tool and charge during debulking of the formed charge.

At the end of the forming step, the compressed air supplies are disconnected or turned off to stop the injection of compressed air between the forming tool and the charge, although the vacuum pump is left running. The clamping arrangement 62 is also retracted. The edges of the bagging film are then sealed against the forming tool by vacuum tape 80 shown in FIG. 18. Next, as shown in FIG. 19, additional vacuum pumps are coupled to the gas ports 42, reversing the flow of air though the gas ports 42 so that the gas ports 42 become vacuum ports. This generates a suction force between the forming tool and the bagging film sheet which causes the bagging film sheet to press the flanges 53, 55 of the laminate charge against the forming tool. The suction force into the positive pressure chambers 36 via the gas injection holes is indicated by arrows 85 in FIG. 20.

In an alternative process, rather than connecting additional vacuum pumps to the gas ports 42, these ports may remain inactive and the vacuum forces pulling the flanges into contact with the forming tool are instead generated by the vacuum pump coupled to the vacuum port 40, with the air flowing into the vacuum chamber via the vacuum holes.

The suction forces air out of the pores in the charge 50, reducing its bulk ready for the next steps. Once the charge has been fully formed, it is heated on the forming tool, with the vacuum pump(s) on, to activate a binder in the dry-fibre plies. Next, the shaped charge is removed from the male forming tool, turned upside down, and fitted into a female infusion tool 90 shown in FIG. 21. The infusion tool 90 has an inverted complementary shape to the forming tool with faces 91-95 corresponding with the faces 1-5 of the forming tool; female corners 96, 98 corresponding with the male corners 6, 8 of the forming tool; and male corners 97, 99 corresponding with the female corners 7, 9 of the forming tool.

Figure 21:
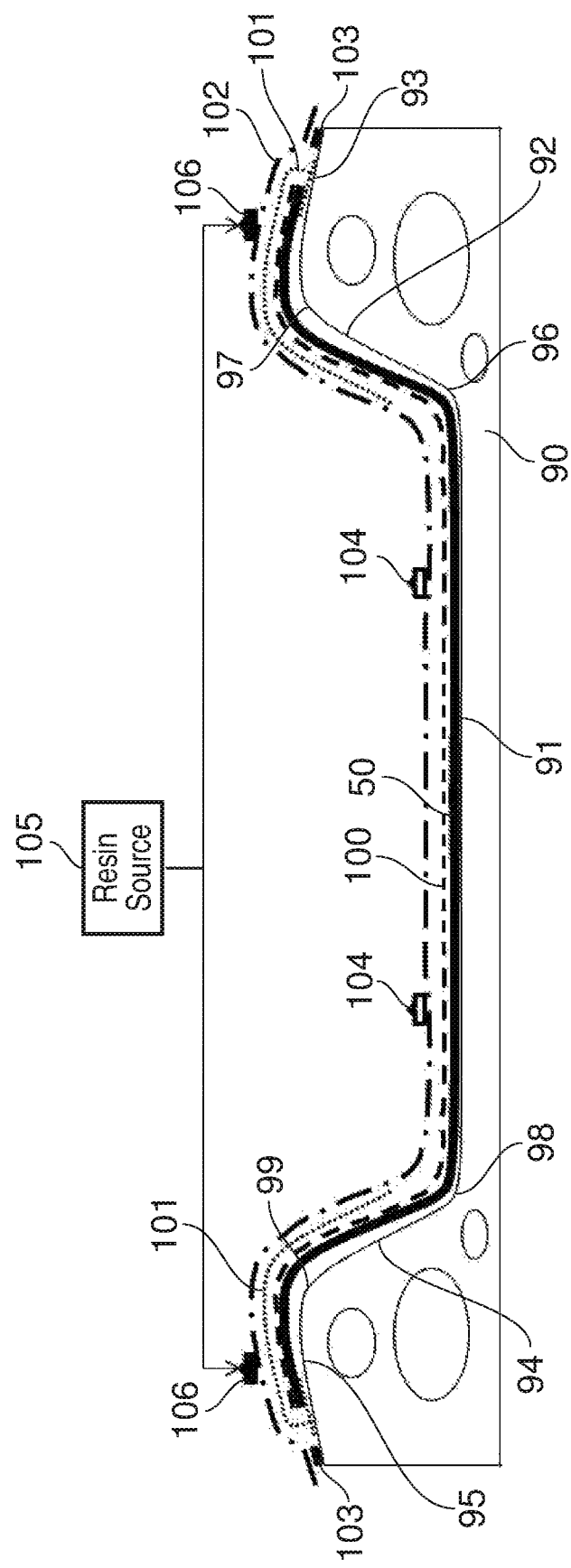
FIG. 21 is a cross sectional view of the charge being infused on a female infusion tool.

A peel ply 100 is laid onto the charge 50, followed by an infusion mesh 101, and a bagging film 102 which is sealed to the infusion tool by sealant tape 103. Alternatively, the infusion tool may be sealed by an integral vacuum system. A vacuum is applied via vacuum valves 104 in the bagging film. A liquid resin source 105 is coupled to infusion ports 106 in the bagging film. The dry-fibre plies of the laminate charge are infused with liquid resin from the source 105 which flows through the infusion mesh 101 and into the charge. The charge could be infused on a male infusion tool, but it has been found that a female tool, as shown in FIG. 21, is preferred. In this preferred arrangement, a female corner 96 of the infusion tool is positioned between the first part 1 of the laminate charge and the second part of the laminate charge, and a male corner 97 of the infusion tool is positioned between the second part 2 of the laminate charge and the third (flange) part 3 of the laminate charge.

The infused charge is then cured and is ready for use in its particular application.

An alternative forming tool will now be described with reference to FIGS. 22 to 31.

Similar to the forming tool 10 shown in FIG. 1, the forming tool 200 has five parts 201-205, and four curved corner parts 206-209 located between each of the five parts 201-205. A first male corner part 206 is located between the first part 201 and the second part 202, and a first female corner part 207 is located between the second part 202 and the third part 203. Similar to the tool of FIG. 1, the forming tool 200 has a second male corner part 208 located between the first part 201 and the fourth part 204, and a second female corner part 209 located between the fourth part 204 and the fifth part 205 forming an "omega" shape.

Figure 23:
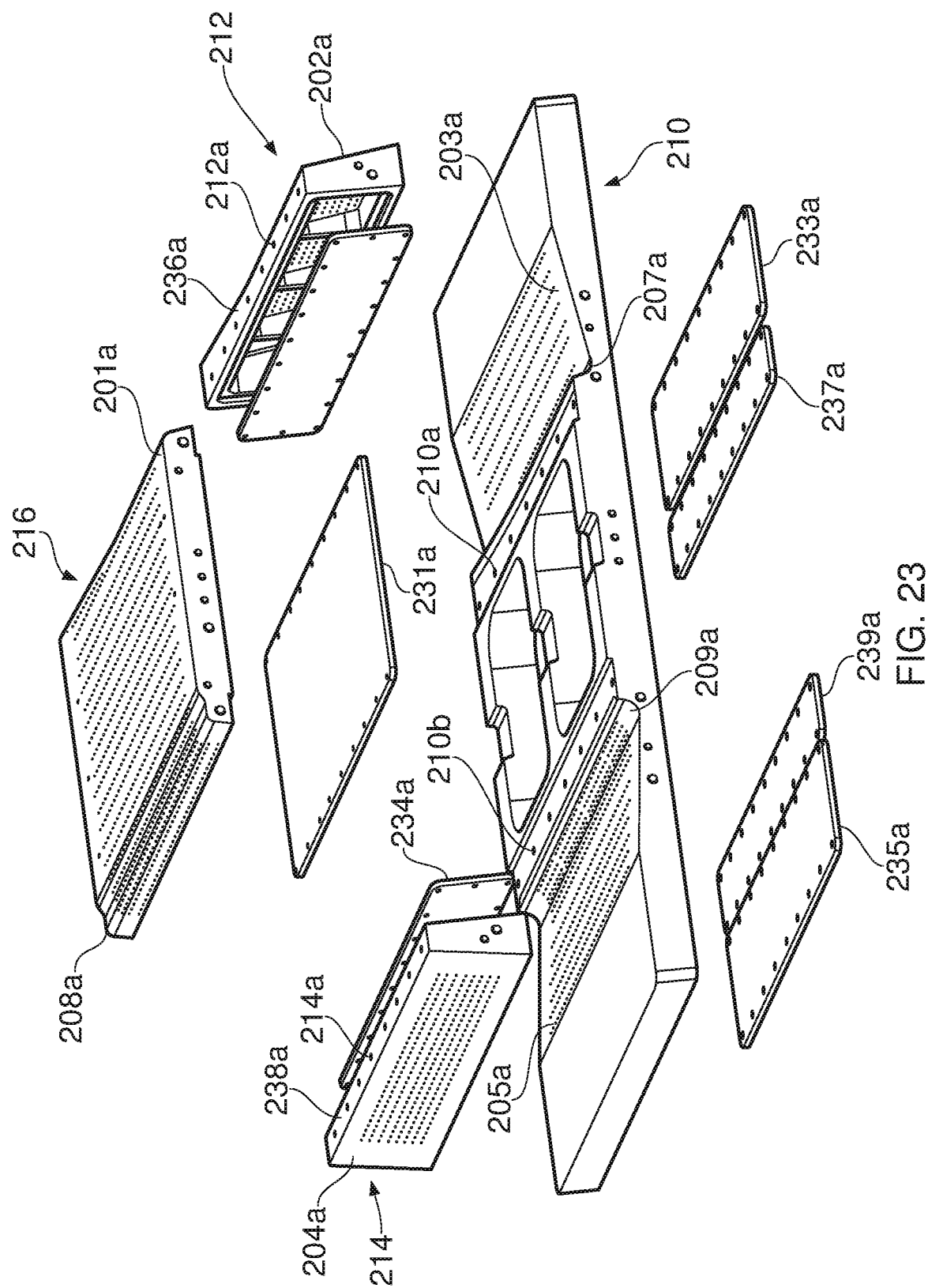
FIG. 23 is an exploded perspective view of the forming tool of FIG. 22.

Referring now to FIG. 23, the forming tool 200 is assembled from a base 210, a first sidewall 212, a second sidewall 214 and an upper section 216. The base 210 has holes 210a and 210b which receive pins (not shown) of the sidewalls 212, 214 to secure the sidewalls 212, 214 to the base. The sidewalls 212, 214 also have holes 212a, 214a which receive pins (not shown) of the upper section 216.

Each of the parts 201-209 has a respective outer surface 201a-209a, the outer surfaces 201a-209a together providing a forming surface of the forming tool. The surfaces 201a-205a are planar faces, and the surfaces 206a-209a are curved male and female corners. Note that the faces 2a,4a in FIG. 1 are parallel, but the faces 202a,204a in FIG. 22 taper inwardly towards the top of the forming tool 200.

Figure 24:
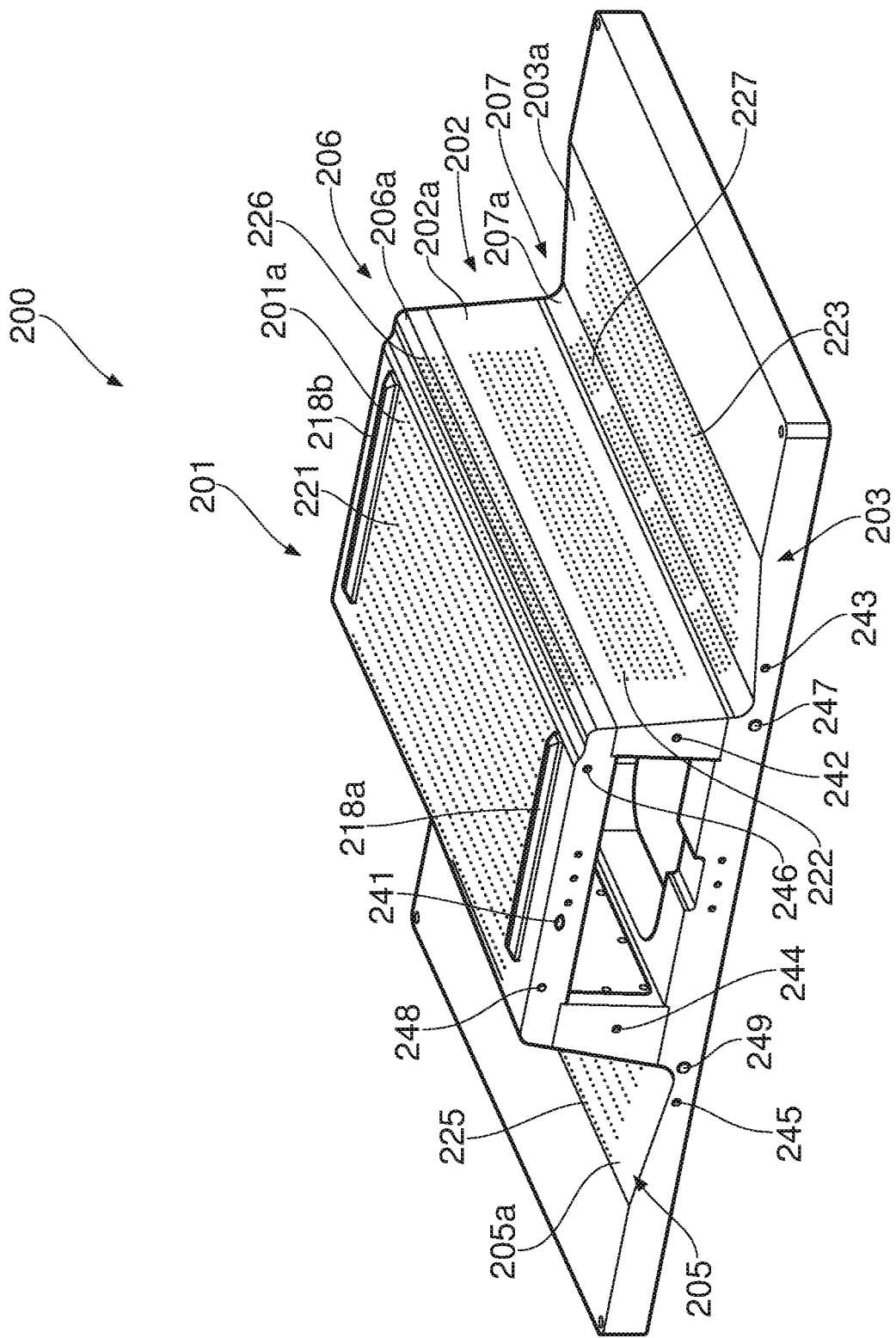
FIG. 24 is a perspective view of the forming tool of FIG. 22.

As shown in FIG. 24, a pair of Aluminium or steel guide rails 218a,b are fitted on each sides of the first (upper) face 201a, to retain the laminate charge (not shown) in place during the forming operation.

As with the forming tool 10 shown in FIG. 1, nine sets of holes 221-229 are provided in the nine outer surfaces 201a-209a of the forming tool 200. These holes will be described in greater detail with reference to FIG. 24.

Figure 22:
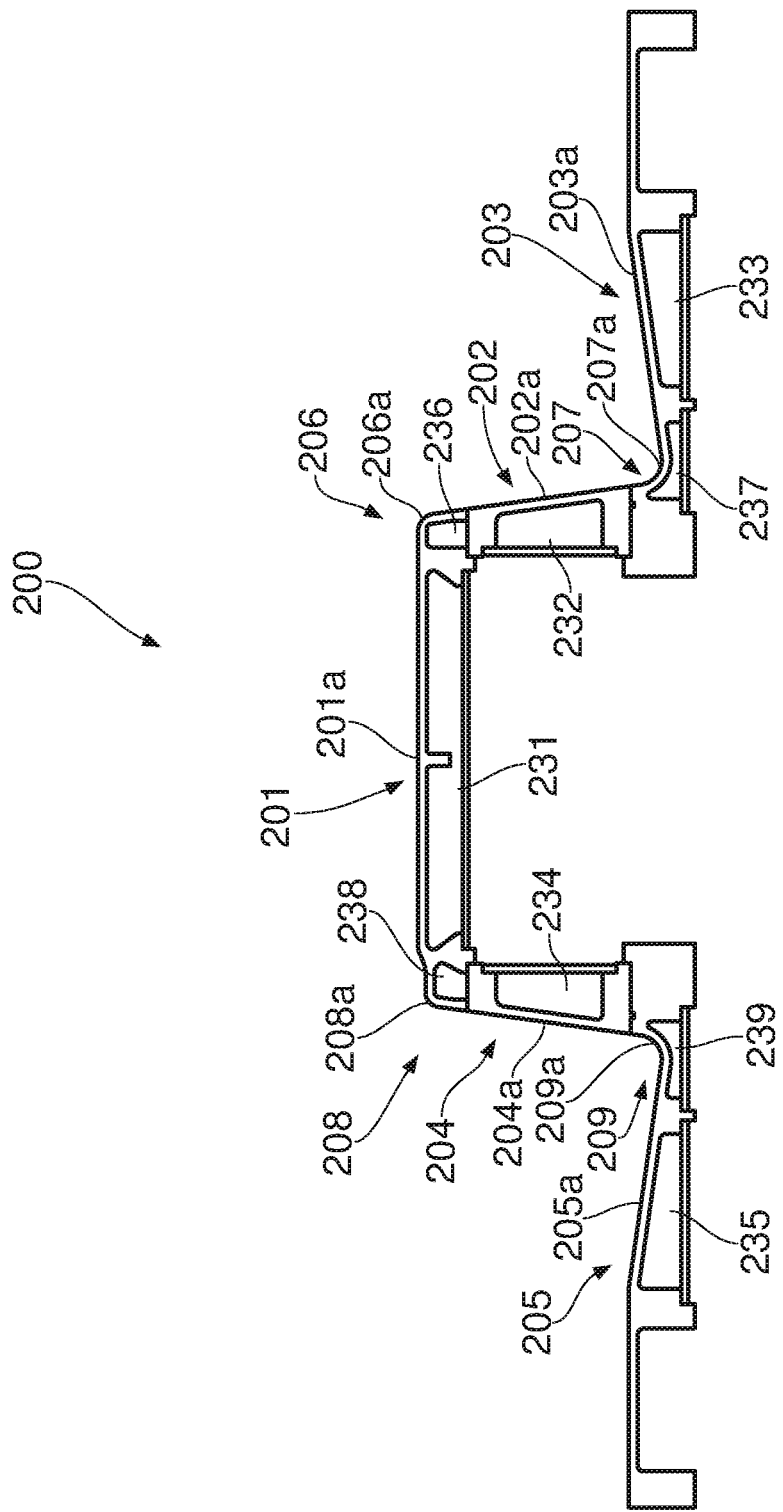
FIG. 22 is a side view of an alternative forming tool.

Whereas the forming tool 10 shown in FIG. 1 has a manifold arrangement, each of the nine parts 201-209 shown in FIG. 22 has a respective chamber 231-239 arranged in fluid communication with the holes 221-229 for that part only, with no fluid communication between the chambers 231-239. The chambers 231-235, 237, 239 are closed by respective plates 231a-235a, 237a, 239a and the chambers 236, 238 in the male corner parts 206, 208 are closed by the upper faces of the sidewalls 212, 214.

Referring to FIG. 24, each surface 201a-209a of the forming tool 200 has a respective set of holes 221-229. Each set of holes 221-229 is in fluid communication with a respective chamber 231-239, and each chamber 231-239 is in fluid communication with a respective port 241-249.

Figure 25:
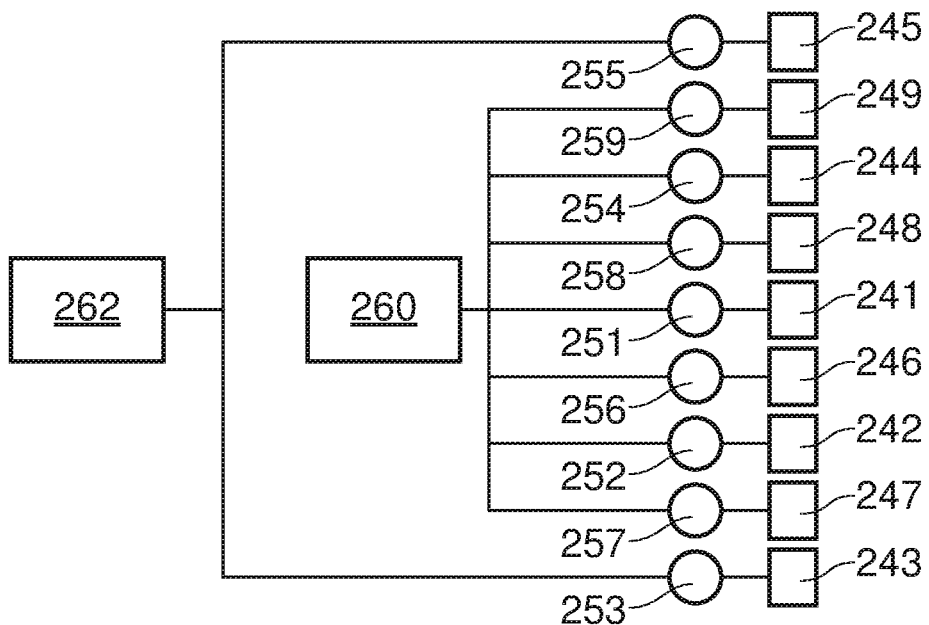
FIG. 25 is a schematic illustration showing how the two pumps are connected to the valves and ports.

Referring to FIG. 25, the ports 241, 242, 244, 246-249 are connected in parallel to a first pump 260 via respective ball valves 251, 252, 254, 256-259 which are also shown in FIG.

27. The ports 243 and 245 are connected in parallel to a second pump 262 via respective ball valves 253, 255, also shown in FIG. 27.

The first pump 260 can be turned on and off via a switch (not shown). When turned on with the ball valves open, the pump 260 provides a suction force at the first, second and fourth faces 201a, 202a, 204a, and at the corners 206a-209a. This vacuum force is applied to the laminate charge via the ports 241, 242, 244, 246-249, the chambers 231, 232, 234, 236-239 and the vacuum holes 221, 222, 224, 226-229.

The second pump 262 can be turned on and off via an on/off switch (not shown), and also switched between a vacuum generation mode and an air injection mode by a second switch (not shown). When in the vacuum generation mode with the ball valves open, the second pump 262 sucks air away from the third and fifth faces 203a, 205a via the ports 243, 245, the chambers 233, 235 and the holes 223, 225, thereby applying a suction force to the flanges of laminate charge. When in the air injection mode with the ball valves open, the second pump 262 injects compressed air via the same route to generate an air cushion adjacent to the third and fifth faces 203a, 205a.

The flow of air through the various sets of holes 221-229 can be controlled independently by operation of the switches and the ball valves 251-259 as described in further detail below.

Figure 26:
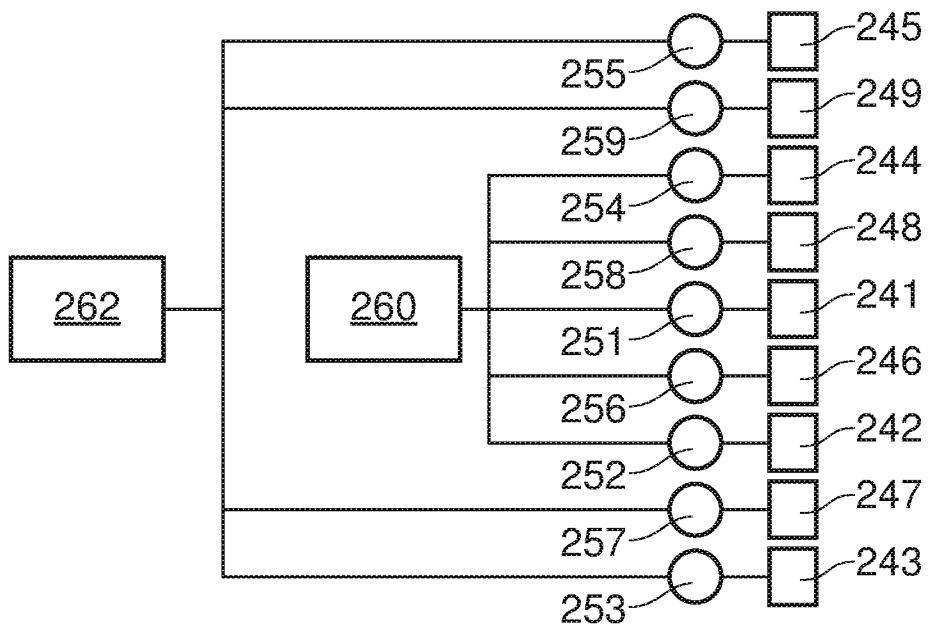
FIG. 26 is a schematic illustration showing an alternative connection arrangement.
Figure 27:
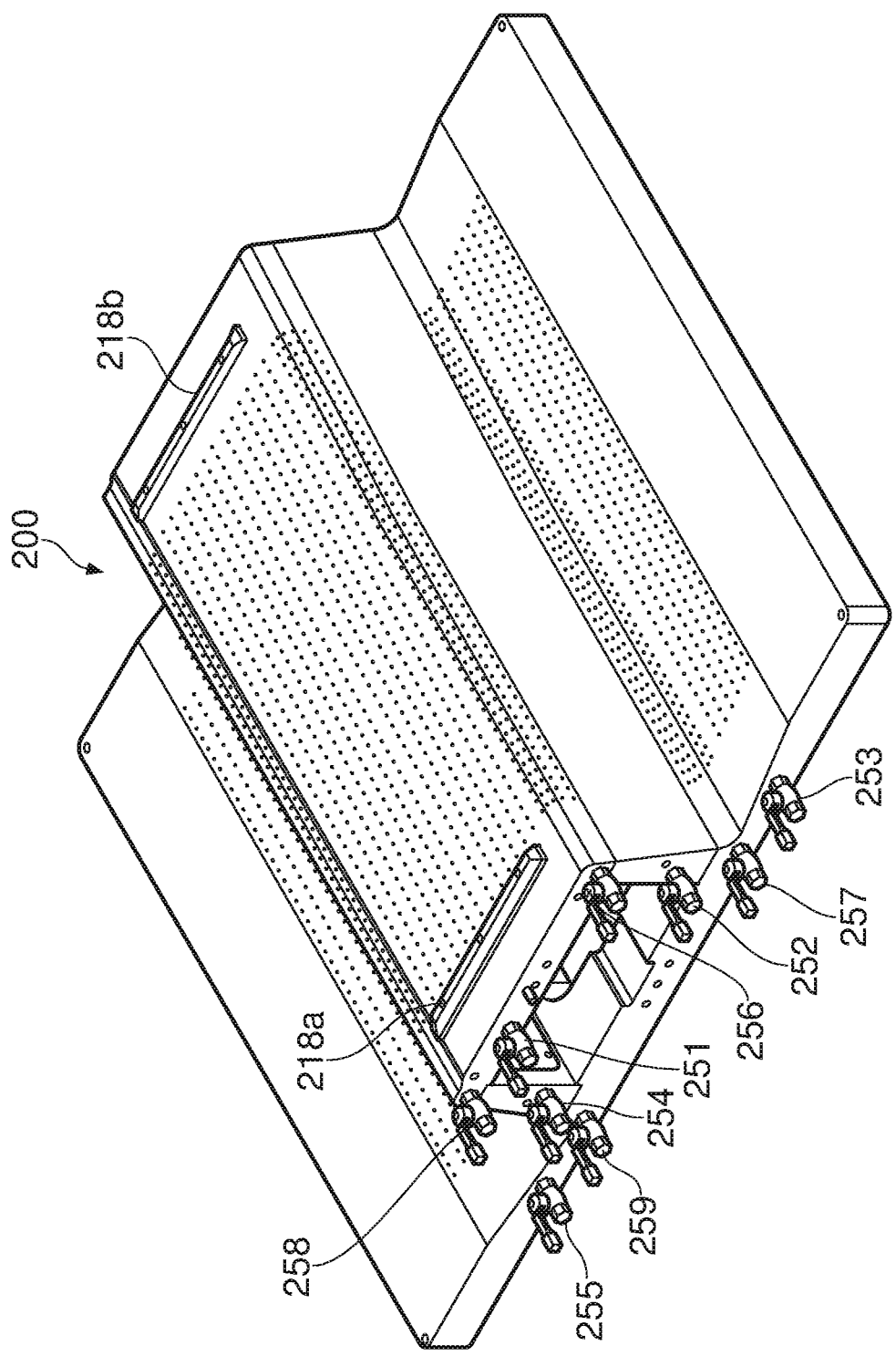
FIG. 27 is a perspective view of the forming tool showing the ball valves.

An alternative arrangement is shown in FIG. 26 in which the ports 247, 249 are connected to the second pump 262 rather than the first pump 260.

It will be appreciated that in other embodiments, the forming tool 200 and apparatus may comprising additional pumps, additional vacuum chambers, additional ball valves and/or additional ports arranged to independently control the suction forces row by row, or hole by hole.

Figure 28:
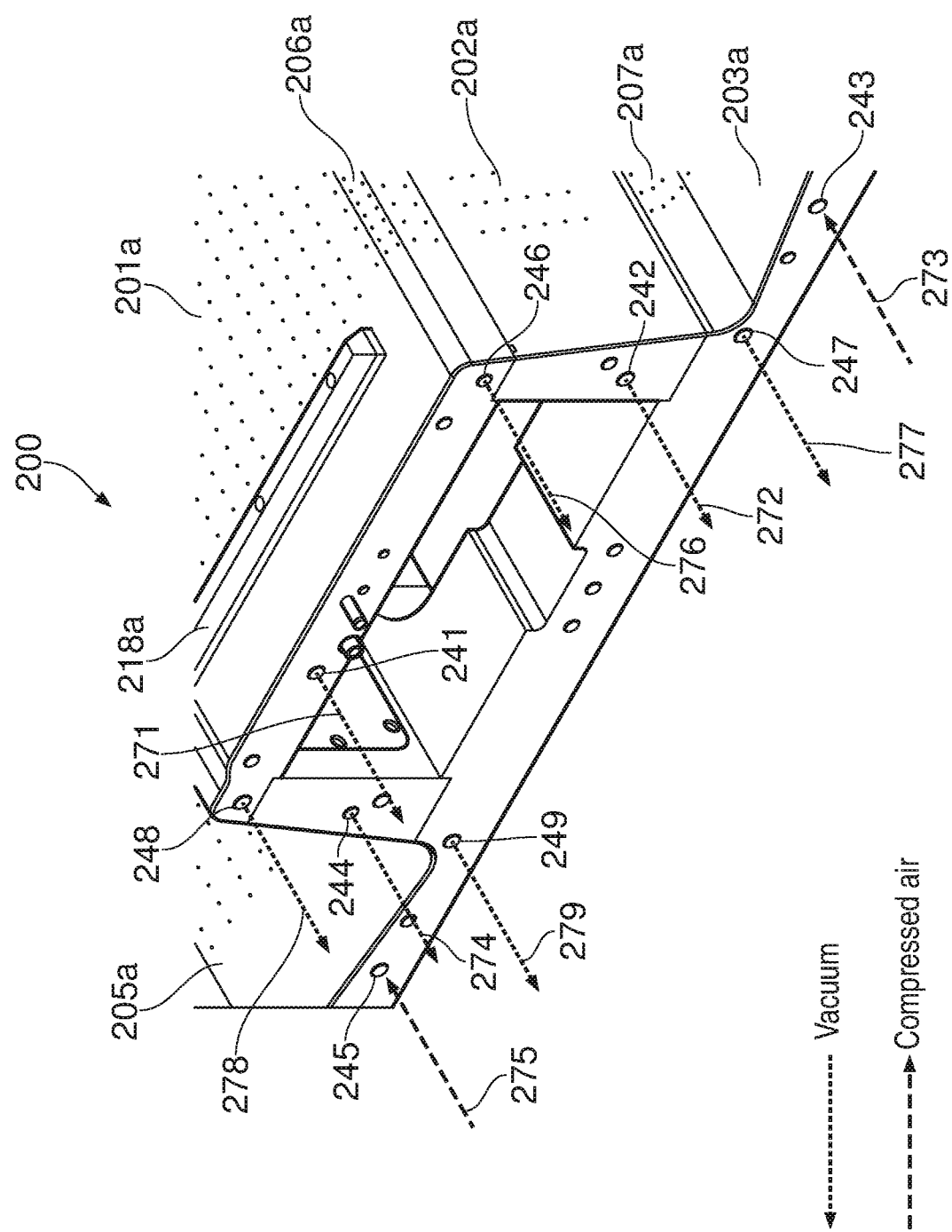
FIG. 28 is a perspective view of the forming tool showing the flow of air in and out of the ports during stages 5 and 16 of the forming sequence.
Figure 29:
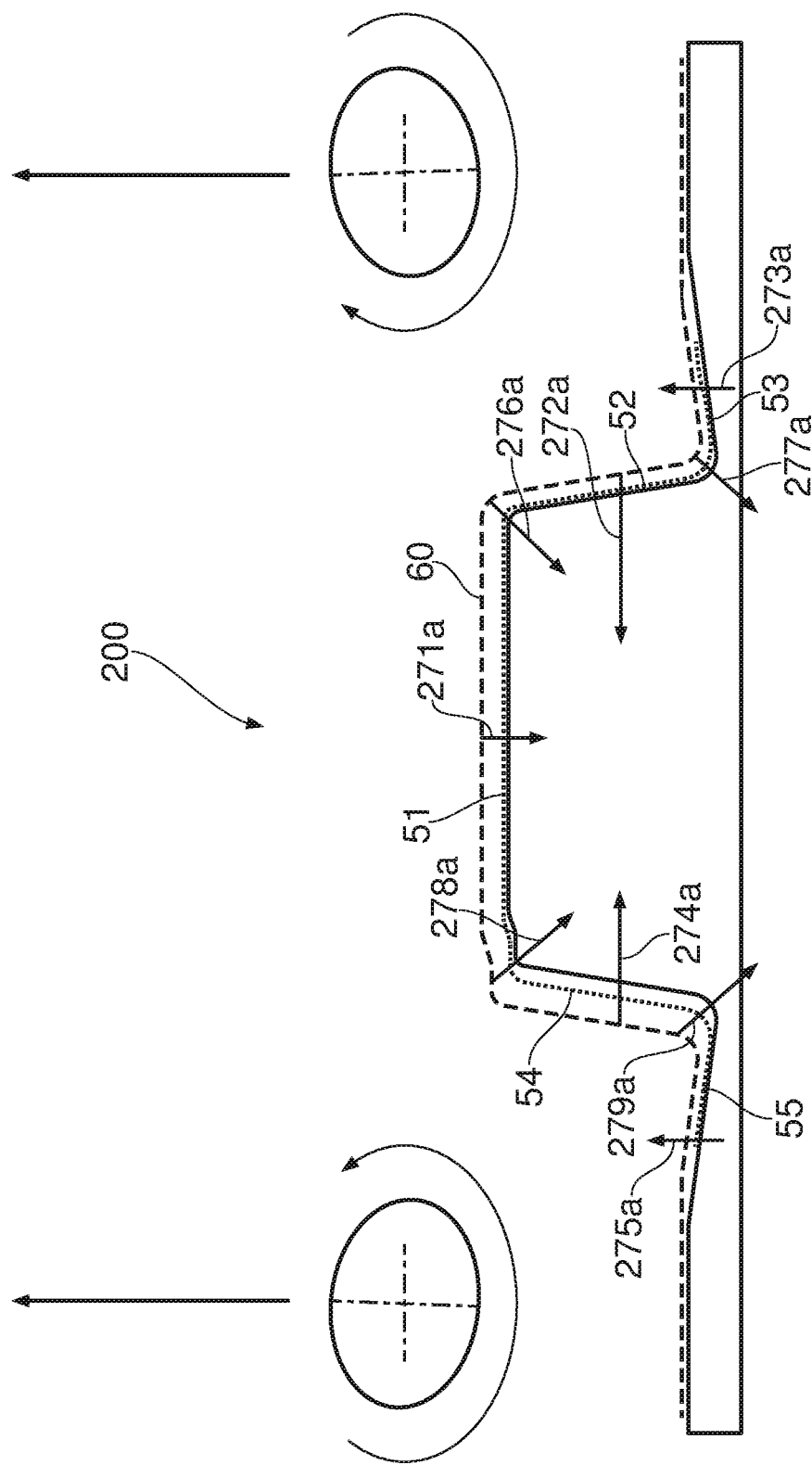
FIG. 29 is a sectional side view of the forming tool showing the suction forces and air cushion during stages 5 and 16 of the forming sequence.
Figure 30:
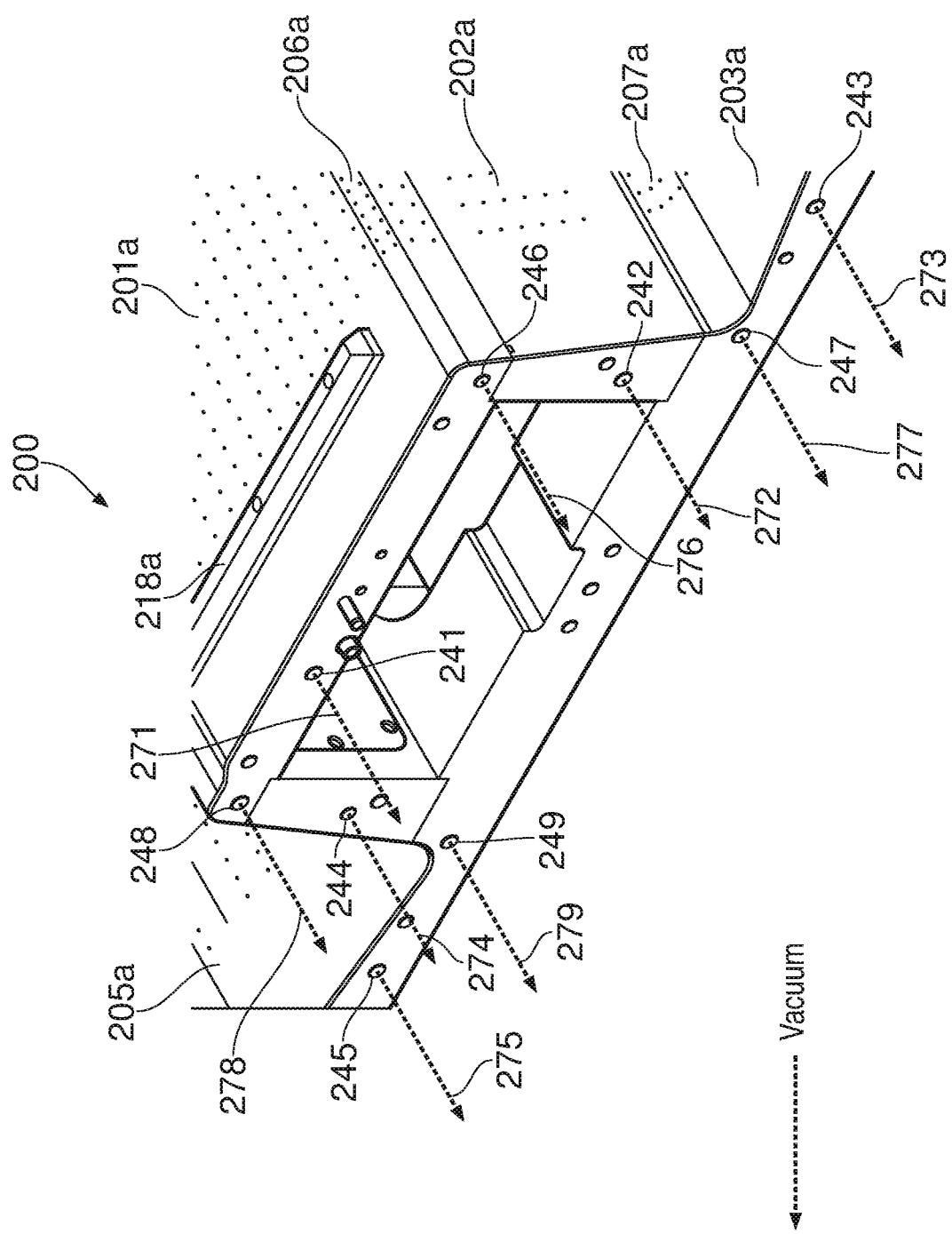
FIG. 30 is a perspective view of the forming tool showing the flow of air out of the ports during stages 10 and 19 of the forming sequence.

A method of forming a laminate charge 50 using the forming tool 200 will now be described with reference to FIGS. 28-31. The laminate charge 50 is the same as the laminate charge 50 described above with reference to the FIGS. 10-21, so it will not be described again Similar to the method described in FIG. 10, in a first step the laminate charge 50 is laid-up onto a horizontal lay-up surface provided by the first face 201a of the forming tool 200, between the guide rails 218a,b. The laminate charge 50 is then draped over the forming tool 200 and a bagging film 60 is applied as shown in FIG. 29.

The right-hand side of the laminate charge is formed first in a series of sequential forming stages set out in Table 1 below. In Table 1, the symbol 0 indicates that a ball valve is closed, the symbol − indicates that air is being sucked away to apply a vacuum force, and the symbol + indicates that air is being injected to generate an air cushion.

TABLE 1

|  | Surface 203a | Surface 207a | Surface 202a | Surface 206a | Surface 201a |
| --- | --- | --- | --- | --- | --- |
| Stage 1 | 0 | 0 | 0 | 0 | − |
| Stage 2 | + | 0 | 0 | 0 | − |
| Stage 3 | + | 0 | 0 | − | − |
| Stage 4 | + | 0 | − | − | − |
| Stage 5 | + | − | − | − | − |
| Stage 6 | + | 0 | − | − | − |
| Stage 7 | + | − | − | − | − |
| Stage 8 | + | 0 | − | − | − |
| Stage 9 | + | − | − | − | − |
| Stage 10 | − | − | − | − | − |

Initially, before stage 1, all of the ball valves are closed. In stage 1 the first pump 260 is switched on, and ball valve 251 is opened so that air 271 shown in FIG. 28 is sucked through the set of holes 221 in the first (upper) face 201a to generate a first suction force 271a between the holes 221 and the bagging film 60 as shown in FIG. 29. The suction force 271a causes the bagging film 60 to press the first part 51 of the laminate charge against the first face 201a of the forming surface. During stage 1, the remaining ball valves 252-259 remain closed so no suction forces are generated between any of the other holes 222-229 and the bagging film 60.

In stage 2, the ball valve 253 is opened with the second pump 262 switched on and in air injection mode, so that compressed air 273 is injected into the port 243 to create an air cushion 273a between the third surface 203a of the forming tool 200 and the flange 53 as shown in FIG. 29.

In stages 3, 4 and 5 the ball valves 256, 252 and 257 are opened one after the other so that air 272, 276, 277 is sucked through the vacuum ports 246, 242 and 247 as shown in FIG. 28. This generates further suction forces 276a, 272a, 277a shown in FIG. 29 via the sets of holes 226, 222, 227 along with the vacuum force 271a which continues to be applied via the set of holes 221. The suction forces 271a, 276a, 272a introduced in stages 1, 3 and 4 cause the bagging film 60 to press the parts 51, 52 of the laminate charge 50 against the upper part of the forming tool and then progressively around the male corner while the flange 53 remains floating on the air cushion. Introducing the suction force 277a in stage 5 causes the charge to be sucked into the female corner.

During stages 1 and 2 of the sequence, the second part 52 of the laminate charge is not in contact with the second face 202a of the forming surface, and during stage 4 the second part 52 of the laminate charge comes into contact with the second face 202a due to the suction force 272a.

In stage 6 the ball valve 257 is closed so that the suction force 277a in the female corner is removed, then in stage 7 the ball valve 257 is re-opened to re-apply the suction force 277a. Stages 6 and 7 are then repeated in stages 8 and 9 respectively. Alternately turning on and off the suction force 277a in this way assists with progressively sucking the charge into the female corner.

Figure 31:
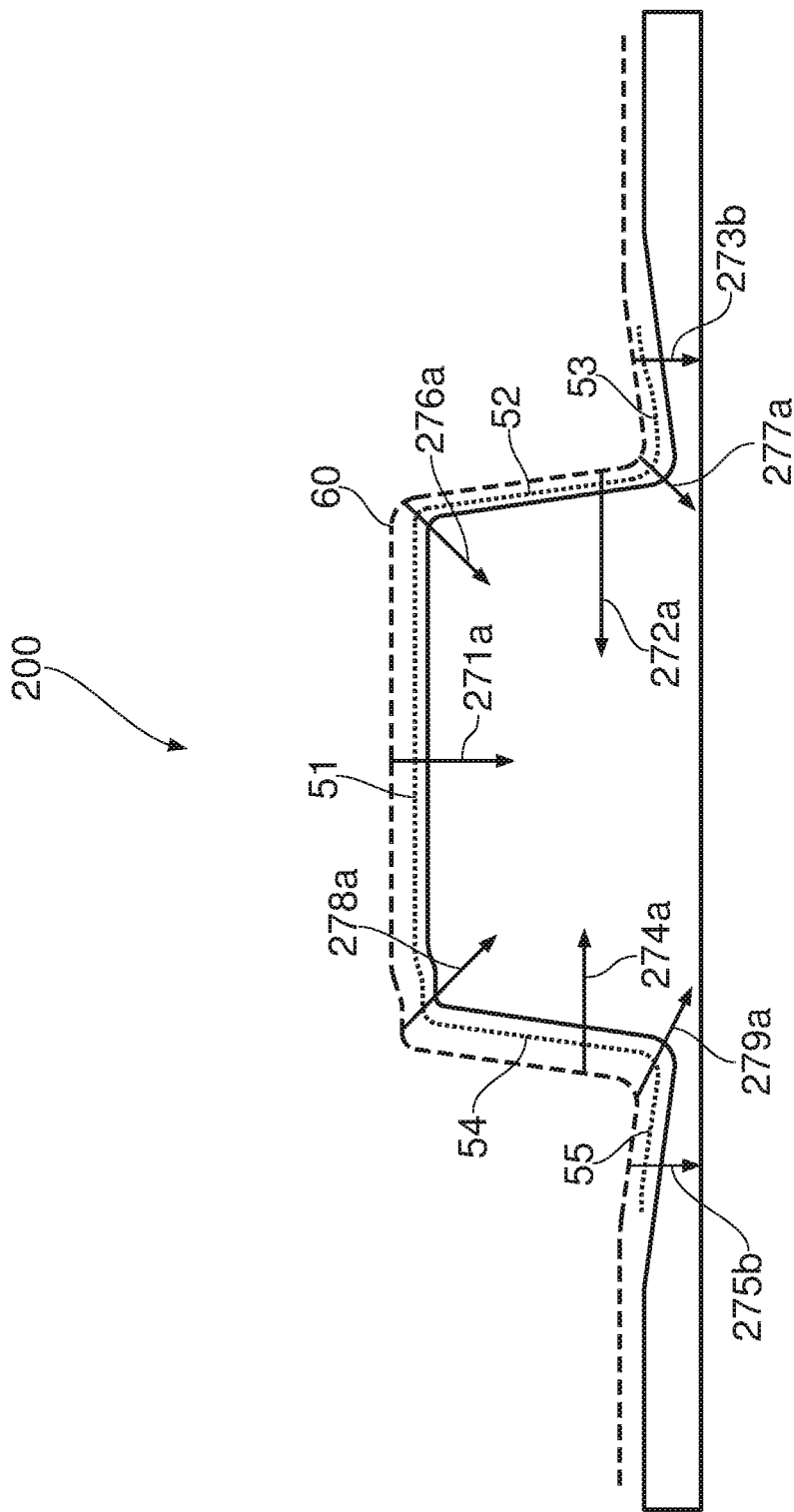
FIG. 31 is a sectional side view of the forming tool showing the suction forces during stages 10 and 19 of the forming sequence.

Finally, in stage 10 the second pump 262 is switched to vacuum generation mode to suck air 273 through the port 243 which generates a suction force 273b shown in FIG. 31 which causes the bagging film 60 to press the flange 53 against the forming tool 200.

The same process is then repeated to form the left-hand side of the laminate charge as set out in Table 2 below.

TABLE 2

|  | Face 201a | Face 208a | Face 204a | Face 209a | Face 205a |
| --- | --- | --- | --- | --- | --- |
| Stage 11 | − | 0 | 0 | 0 | + |
| Stage 12 | − | − | 0 | 0 | + |
| Stage 13 | − | − | − | 0 | + |
| Stage 14 | − | − | − | − | + |
| Stage 15 | − | − | − | 0 | + |
| Stage 16 | − | − | − | − | + |
| Stage 17 | − | − | − | 0 | + |
| Stage 18 | − | − | − | − | + |
| Stage 19 | − | − | − | − | − |

In this example, the left and right-hand sides of the laminate charge are formed one after the other. Alternatively, the processes of Tables 1 and 2 may be run at the same time, so that the left and right-hand sides of the laminate charge are formed simultaneously.

After the forming process has been completed, the laminate charge is then cured in the same fashion as described above with reference to FIG. 21.

One preferred application for the charge formed by any of the tools described above is as a component part of a torsion-box of an aircraft wing (known as a wing-box). In such a wing-box, the second and fourth parts of the charge provide the fore and aft spars of the wing-box, the first part provides a lower wing skin, and the flanges act as attachment points for an upper wing skin. Other applications for the charge include automotive (car floor panel), mass transit, wind turbine, boat hulls, marine turbine or engine parts (jet engines).

Although the invention has been described above with reference to one or more preferred embodiments, it will be appreciated that various changes or modifications may be made without departing from the scope of the invention as defined in the appended claims.

The invention claimed is:

1. A method of forming a laminate charge, the laminate charge having first, second and third parts, the method comprising:
mounting the laminate charge on a forming tool, the forming tool having a first male corner and a first female corner;
in a forming step, generating a first suction force between the forming tool and an impermeable sheet which causes the impermeable sheet to press the laminate charge against the first male corner of the forming tool and into the first female corner of the forming tool, wherein the first male corner of the forming tool is positioned between the first and second parts of the laminate charge, and the first female corner of the forming tool is positioned between the second and third parts of the laminate charge;
during the forming step, injecting first gas between the forming tool and the third part of the laminate charge to create a first gas cushion between the forming tool and the third part of the laminate charge; and,
wherein the first gas is injected at the same time as the first suction force is generated.

2. The method of claim 1, further comprising, after the forming step, stopping the injection of gas between the forming tool and the third part of the laminate charge, and generating a suction force between the forming tool and the impermeable sheet which causes the impermeable sheet to press the third part of the laminate charge against the forming tool.

3. The method of claim 1, wherein the third part of the laminar charge is a flange with an edge, and at least some of the first gas injected between the forming tool and the third part of the laminate charge exits the gas cushion by flowing past the edge of the flange.

4. The method of claim 1, wherein the laminate charge comprises a stack of dry-fibre plies.

5. The method of claim 4 further comprising infusing the dry-fibre plies of the laminate charge with a liquid matrix material after the forming step.

6. The method of claim 4 further comprising removing the laminate charge from the forming tool after the forming step; placing the laminate charge on an infusion tool with a female corner of the infusion tool positioned between the first part of the laminate charge and the second part of the laminate charge, and a male corner of the infusion tool positioned between the second part of the laminate charge and the third part of the laminate charge; and infusing the dry-fibre plies of the laminate charge on the infusion tool with a liquid matrix material.

7. The method of claim 2 wherein the first suction force which causes the impermeable sheet to press the laminate charge against the male corner of the forming tool and into the female corner of the forming tool, and the suction force which causes the impermeable sheet to press the third part of the laminate charge against the forming tool, are generated by the same vacuum generator.

8. The method of claim 1, wherein:
the laminate charge has fourth and fifth parts;
the forming tool has a second male corner and a second female corner; and
the method further comprises:
in the forming step, generating a second suction force between the forming tool and the impermeable sheet which causes the impermeable sheet to press the laminate charge against the second male corner of the forming tool and into the second female corner of the forming tool, wherein the second male corner of the forming tool is positioned between the first and fourth parts of the laminate charge, and the second female corner of the forming tool is positioned between the fourth and fifth parts of the laminate charge; and
during the forming step, injecting second gas between the forming tool and the fifth part of the laminate charge in order to create a second gas cushion between the forming tool and the fifth part of the laminate charge.

9. The method of claim 8 further comprising, after the forming step, stopping the injection of gas between the forming tool and the fifth part of the laminate charge, and generating a third suction force between the forming tool and the impermeable sheet which causes the impermeable sheet to press the fifth part of the laminate charge against the forming tool.

10. The method of claim 1, wherein the male corner is positioned between a first face of the forming tool and a second face of the forming tool; the female corner is positioned between the second face of the forming tool and a third face of the forming tool; the forming tool has vacuum openings in the first and second faces of the forming tool and gas injection openings in the third face of the forming tool; the first suction force is generated by sucking gas through the vacuum openings; and the first gas is injected between the forming tool and the third part of the laminate charge through the gas injection openings.

11. The method of claim 1, wherein the laminate charge comprises a stack of fibre plies.

12. The method of claim 1, further comprising the further step of tensioning the impermeable sheet over the forming tool.

13. The method of claim 1, further comprising the further step of clamping the impermeable sheet against the forming tool.

14. The method of forming a laminate charge according to claim 1, wherein the first gas cushion lifts up the third part of the laminate charge.

15. The method of forming a laminate charge according to claim 1, wherein the charge drapes down under its own weight over the first male corner.

16. The method of forming a laminate charge according to claim 1,
wherein the first male and first female corners of the forming tool are both positioned below the laminate charge.

* * * * *